US012700637B2

(12) United States Patent
Yoon et al.

(10) Patent No.: US 12,700,637 B2
(45) Date of Patent: Aug. 4, 2026

(54) BATTERY PACK

(71) Applicant: Samsung SDI Co., Ltd., Yongin-si (KR)

(72) Inventors: Seokbin Yoon, Yongin-si (KR); Deayon Moon, Yongin-si (KR); Kwangsoo Bae, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 826 days.

(21) Appl. No.: 17/751,508

(22) Filed: May 23, 2022

(65) Prior Publication Data

US 2022/0376339 A1      Nov. 24, 2022

(30) Foreign Application Priority Data

May 24, 2021   (KR) ........................ 10-2021-0066485
May 20, 2022   (KR) ........................ 10-2022-0062316

(51) Int. Cl.
H01M 50/244      (2021.01)
H01M 50/213      (2021.01)
H01M 50/262      (2021.01)

(52) U.S. Cl.
CPC ....... H01M 50/244 (2021.01); H01M 50/213 (2021.01); H01M 50/262 (2021.01)

(58) Field of Classification Search
CPC ............. H01M 50/244; H01M 50/213; H01M 50/262; H01M 50/291; H01M 50/258; H01M 50/264; H01M 50/289; H01M 50/271; H01M 50/505; H01M 50/502; H01M 50/5503; H01M 50/269; H01M 50/507; H01M 10/486; H01M 10/482
See application file for complete search history.

(56) References Cited

U.S. PATENT DOCUMENTS 9,577,227 B2    2/2017  Sumpf et al.
9,899,646 B2    2/2018  Nakamura et al.
11,223,076 B2   1/2022  Jeong et al.
11,355,810 B2   6/2022  Haertel et al.
(Continued)

FOREIGN PATENT DOCUMENTS

CN         102257652 A      11/2011
CN         202662692 U   *   1/2013   ............. Y02E 60/10
(Continued)

OTHER PUBLICATIONS

EPO Extended European Search Report dated Oct. 14, 2022, issued in corresponding European Patent Application No. 22175071.4 (9 pages).
(Continued)

*Primary Examiner* — Adam J Francis
(74) *Attorney, Agent, or Firm* — Womble Bond Dickinson (US) LLP

(57)                ABSTRACT

A battery pack includes multiple battery cells, and a cell holder assembled with the multiple battery cells, the cell holder including a rim portion around an outer circumference of a first battery cell from among the multiple battery cells and multiple protrusions at positions along the rim portion and protruding from the rim portion in a height direction. Side surfaces of the multiple protrusions facing the outer circumference of the first battery cell have a gradient in the height direction.

22 Claims, 20 Drawing Sheets

(56) References Cited

U.S. PATENT DOCUMENTS

| | | | |
|---|---|---|---|
| 11,670,825 | B2 | 6/2023 | Seol |
| 2009/0111015 | A1* | 4/2009 | Wood .................. H01M 50/291 |
| | | | 429/164 |
| 2009/0117452 | A1 | 5/2009 | Wiesner et al. |
| 2011/0076521 | A1* | 3/2011 | Shimizu .............. H01M 50/529 |
| | | | 429/82 |
| 2011/0135993 | A1* | 6/2011 | An .................... H01M 10/6557 |
| | | | 429/156 |
| 2012/0301747 | A1 | 11/2012 | Han et al. |
| 2014/0093755 | A1 | 4/2014 | Houchin-Miller et al. |
| 2014/0248520 | A1* | 9/2014 | Ward ................ H01M 10/6557 |
| | | | 429/100 |
| 2015/0023392 | A1 | 1/2015 | Noh |
| 2015/0111082 | A1* | 4/2015 | Sumpf ................ H01M 50/262 |
| | | | 429/120 |
| 2015/0118530 | A1 | 4/2015 | Lee |
| 2015/0214583 | A1 | 7/2015 | Lim et al. |
| 2016/0093853 | A1* | 3/2016 | Nakamura .......... H01M 50/213 |
| | | | 429/156 |
| 2019/0198845 | A1 | 6/2019 | Bae et al. |
| 2019/0237713 | A1* | 8/2019 | Seol .................... H01M 10/643 |
| 2020/0127249 | A1* | 4/2020 | Yoon ................ H01M 10/6556 |
| 2020/0194853 | A1 | 6/2020 | Yoo et al. |
| 2020/0220122 | A1* | 7/2020 | Haertel .............. H01M 50/505 |
| 2020/0235372 | A1 | 7/2020 | Fuhr et al. |
| 2021/0036300 | A1 | 2/2021 | Bae |
| 2021/0135312 | A1 | 5/2021 | Lavoie et al. |
| 2023/0216147 | A1 | 7/2023 | Yoon et al. |

FOREIGN PATENT DOCUMENTS

| | | | |
|---|---|---|---|
| CN | 105470419 | A | 4/2016 |
| CN | 105659430 | A | 6/2016 |
| CN | 111416074 | A | 7/2020 |
| CN | 112366405 | A | 2/2021 |
| CN | 219677493 | U | 9/2023 |
| EP | 2022110 | B1 | 10/2011 |
| EP | 3576215 | A1 | 12/2019 |
| EP | 3678213 | A1 | 7/2020 |
| JP | 2007-48637 | A | 2/2007 |
| JP | 5812903 | B2 | 11/2015 |
| KR | 10-2015-0048501 | A | 5/2015 |
| KR | 10-2015-0089483 | A | 8/2015 |
| KR | 10-1629497 | B1 | 6/2016 |
| KR | 10-2019-0047499 | A | 5/2019 |
| KR | 10-2019-0078094 | A | 7/2019 |
| KR | 10-2019-0093008 | A | 8/2019 |
| KR | 10-2020-0036640 | A | 4/2020 |
| KR | 2204303 | B1 * | 1/2021 | ......... H01M 10/613 |
| KR | 10-2021-0035508 | A | 4/2021 |
| WO | WO 2007/134198 | A1 | 11/2007 |
| WO | WO-2019043413 | A1 * | 3/2019 | ........... H01M 2/105 |

OTHER PUBLICATIONS

EPO Extended European Search Report dated Oct. 20, 2022, issued in corresponding European Patent Application No. 22175253.8 (9 pages).

Chinese Office Action for CN Appl. No. 202210575108.8 dated Dec. 25, 2023 with English translation, 16 pages.

Chinese Office Action corresponding to CN Application No. 202210575100.1, dated Jul. 5, 2025 (6 pages).

U.S. Office Action dated Apr. 14, 2025, issued in U.S. Appl. No. 17/751,568 (19 pages).

U.S. Final Office Action dated Jul. 23, 2025, issued in U.S. Appl. No. 17/751,568 (21 pages).

European Office Action corresponding to EP Application No. 22 175 253.8, dated Oct. 13, 2025 (5 pages).

European Office Action corresponding to EP Application No. 22 175 071.4, dated Oct. 14, 2025 (5 pages).

U.S. Notice of Allowance dated Nov. 18, 2025, issued in U.S. Appl. No. 17/751,568 (11 pages).

* cited by examiner

BATTERY PACK

CROSS-REFERENCE TO RELATED APPLICATIONS

This application claims priority to and the benefit of each of Korean Patent Application No. 10-2021-0066485, filed on May 24, 2021 in the Korean Intellectual Property Office (KIPO), and Korean Patent Application No. 10-2022-0062316, filed on May 20, 2022 in the KIPO, the entire contents of both of which are incorporated by reference herein.

BACKGROUND

1. Field

One or more embodiments relate to a battery pack.

2. Description of the Related Art

Generally, a secondary battery is a chargeable/dischargeable battery unlike a primary battery that cannot be charged. A secondary battery is used as an energy source of mobile devices, electric vehicles, hybrid vehicles, electric bicycles, uninterruptible power supplies, and the like, and is used in the form of a single battery or a pack of batteries connected according to the type of an external device to which the secondary battery is applied.

Small-sized mobile devices such as a mobile phone can be operated for a certain time with an output and capacity of a single battery, but electric vehicles, hybrid vehicles, and large-sized mobile devices such as laptop computers may consume a large amount of power and may be operated for a long time at a high power level. In this case, a pack of batteries may be preferred in terms of output and capacity. For example, an output voltage or current may be increased by increasing the number of batteries included in a pack.

SUMMARY

Aspects of one or more embodiments of the present disclosure are directed to a battery pack capable of providing scalability, whereby a module with various suitable outputs and capacities may be provided by setting a battery pack having the same structure to one unit and connecting such multiple battery packs, and various suitable outputs and capacities may be adaptively achieved battery packs having the same structure by increasing or reducing the number of battery packs to be included in the module.

One or more embodiments include a battery pack with a cell holder having an improved structure to guide battery cells, which are to be assembled together, to a normal position (e.g., a desired position) and fix (e.g., firmly fix) positions of the battery cells.

Additional aspects will be set forth in part in the description which follows and, in part, will be apparent from the description, or may be learned by practice of the presented embodiments of the present disclosure.

According to one or more embodiments, a battery pack includes multiple battery cells; and a cell holder assembled with the multiple battery cells, the cell holder including: a rim portion around (e.g., surrounding) an outer circumference of a first battery cell from among the multiple battery cells; and multiple protrusions at positions along the rim portion and protruding from the rim portion in a height direction. Side surfaces of the multiple protrusions facing the outer circumference of the first battery cell have a gradient in the height direction (e.g., a gradient in the height direction to form a trajectory gradually changing in the height direction).

For example, the side surfaces of the multiple protrusions may define a trajectory (e.g., a circular trajectory) having a diameter that decreases (e.g., gradually decreases) in the height direction.

For example, the side surfaces of the multiple protrusions may define a trajectory (e.g., a circular trajectory) having a diameter that decreases (e.g., gradually decreases) in an assembly direction of the first battery cell in the height direction.

For example, the side surfaces of the multiple protrusion may extend from the rim portion forming a common support base of the multiple protrusions to protruding end portions of the multiple protrusions opposite to the rim portion.

For example, the side surfaces of the protrusions may connect the rim portion to the protruding end portions in the height direction.

For example, a diameter of a first trajectory (e.g., a first circular trajectory) defined by the side surfaces of the multiple protrusions in contact with the protruding end portions may be greater than a diameter of a second trajectory (e.g., a second circular trajectory) defined by the side surfaces of the multiple protrusions in contact with the rim portion.

For example, the diameters of the first and second trajectories may be greater than a diameter of the first battery cell.

For example, the multiple protrusions may include a first protrusion, a second protrusion and a third protrusion along the rim portion around (e.g., surrounding) the outer circumference of the first battery cell.

For example, the multiple battery cells may include six satellite battery cells around (e.g., surrounding) the first battery cell in a direction of an outer circumference of the first battery cell.

For example, valleys may be provided between every two neighboring satellite battery cells and the first battery cell in the direction of the outer circumference of the first battery cell. A total number of six valleys may be in the direction of the outer circumference of the first battery cell. The first protrusion, the second protrusion, and the third protrusion may be provided in valleys at alternate positions on the rim portion around (e.g., surrounding) the first battery cell.

For example, supports having a round shape and concavely recessed toward an outer circumferential surface of the first battery cell from valleys from among the valleys that may be at three alternate positions at which the first protrusion, the second protrusion, and the third protrusion are not formed along the rim portion around (e.g., surrounding) the first battery cell.

For example, the multiple protrusions and the supports may be alternately arranged on the valleys at alternate positions along the rim portion around (e.g., surrounding) the first battery cell.

For example, a narrow portion having a narrow width and concavely recessed between a protrusion from among the first protrusion, the second protrusion, and the third protrusion and a support from among the supports along the rim portion around (e.g., surrounding) the first battery cell.

For example, the narrow portion may include multiple narrow portions at six positions (e.g., a total of six positions) along the rim portion around (e.g., surrounding) the first battery cell.

For example, the narrow portion may include a contact protrusion protruding toward the outer circumference of the first battery cell.

For example, the contact protrusion may protrude toward the outer circumferential surface of the first battery cell to form an interference fit with the outer circumferential surface of the first battery cell.

For example, the narrow portion may include multiple narrow portions. The contact protrusion may include multiple contact protrusions protruding from the multiple narrow portions at six symmetrical positions along the rim portion around (e.g., surrounding) the first battery cell.

For example, the rim portion may include multiple rim portions. The multiple rim portions each around (e.g., surrounding) the first battery cell and two neighboring satellite battery cells in the direction of the outer circumference of the first battery cell may diverge at a divergence point in each of the valleys.

For example, the multiple rim portions may diverge in an angular form from the divergence point in three directions.

For example, a curved surface (e.g., a round curved surface) may be provided at (e.g., on) six divergence points along the outer circumference of the first battery cell, the curved surface facing the outer circumference of the first battery cell through the multiple protrusions and supports alternately provided at alternate positions.

For example, a side surface of a protrusion from among the multiple protrusions and an end portion of the support from among the supports facing the outer circumference of the first battery cell may provide curved surfaces having a concave shape facing the outer circumference of the first battery cell.

For example, a narrow portion having a narrow width and concavely recessed may be provided between the protrusion and the support along the rim portion around (e.g., surrounding) the first battery cell.

For example, the narrow portion may be consecutively connected between the protrusion and the support to provide a curved surface (e.g., a round curved surface) having a concave shape facing the outer circumference of the first battery cell.

For example, the rim portion may extend in a net form to surround the multiple battery cells so as to form a main surface of a cell holder. A lower end of the first battery cell may protrude by a fixing depth from the main surface of the cell holder in the height direction.

For example, the first battery cell may be assembled on the cell holder in an assembly direction from the lower end of the first battery cell to an upper end thereof in the height direction.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
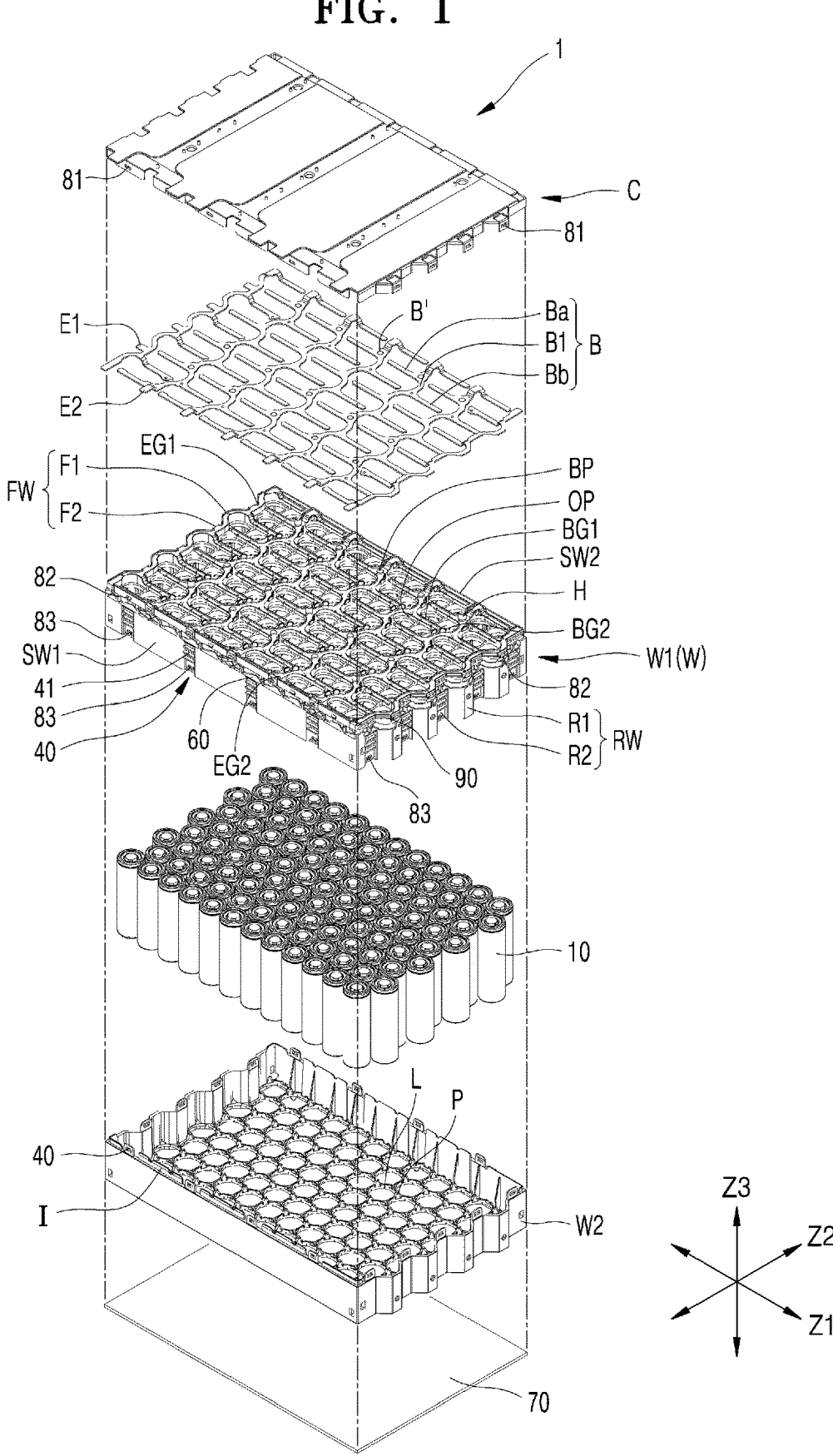
FIG. 1 is an exploded perspective view of a battery pack according to an embodiment of the present disclosure.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to limit the embodiments described herein.

As used herein, the singular forms "a," "an," and "the" are intended to include the plural forms as well, unless the context clearly indicates otherwise.

It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

Further, the use of "may" when describing embodiments of the present disclosure refers to "one or more embodiments of the present disclosure."

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

In the drawings, the relative sizes of elements, layers, and regions may be exaggerated and/or simplified for clarity. Spatially relative terms, such as "beneath," "below," "lower," "above," "upper," "bottom," "top," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "substantially," "about," and similar terms are used as terms of approximation and not as terms of degree, and are intended to account for the inherent deviations in measured or calculated values that would be recognized by those of ordinary skill in the art.

Although the terms "first," "second," etc. may be used to describe various elements, these elements should not be limited by these terms. These terms are only used to distinguish one element from another element. For example, a first element may be referred to as a second element, and similarly, a second element may also be referred to as a first element without departing from the scope of the present disclosure.

Unless otherwise defined, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a battery pack according to an embodiment of the present disclosure will be described with reference to the accompanying drawings.

Figure 2:
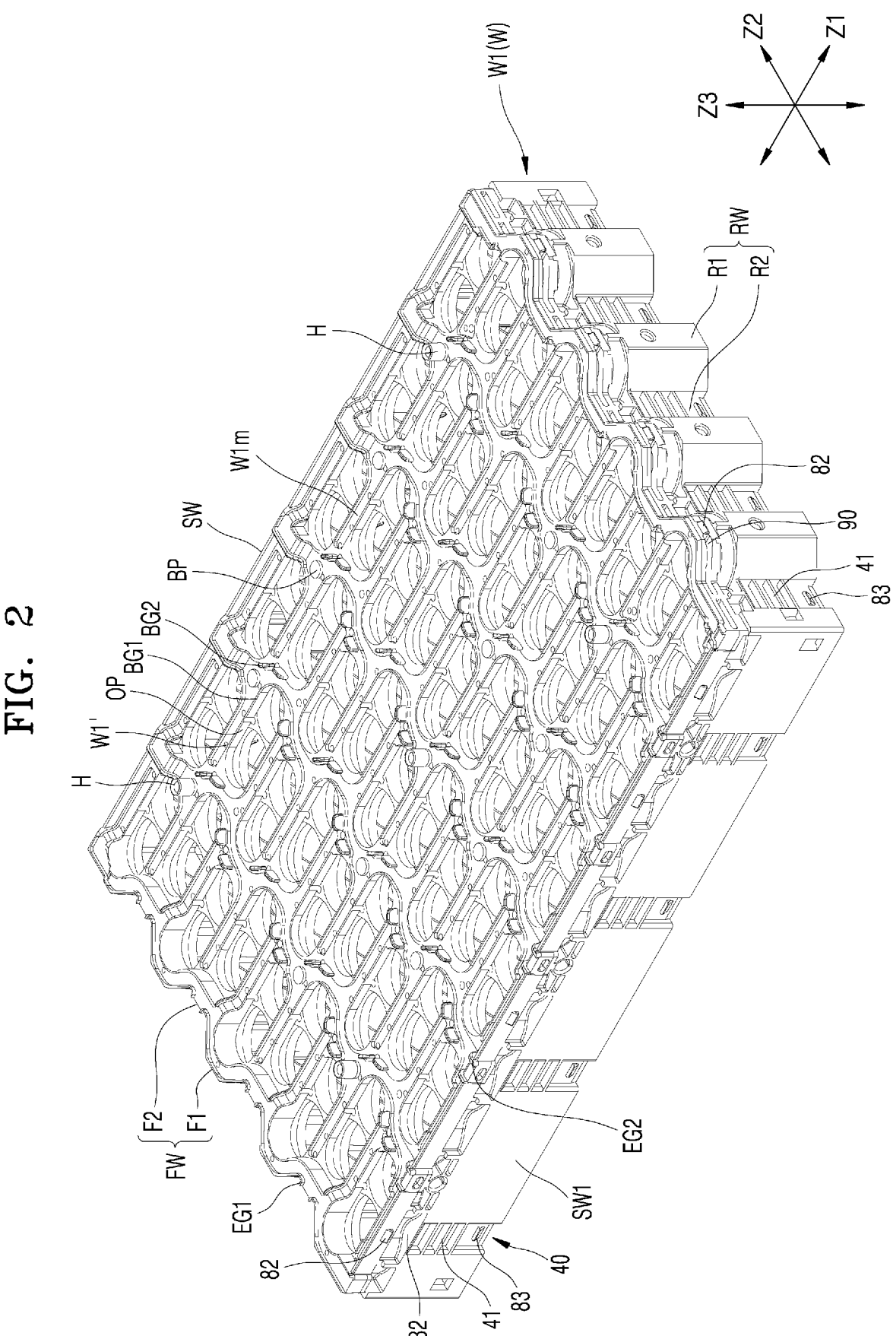
FIGS. 2 and 3 are perspective views of an upper holder and a lower holder illustrated in FIG. 1, respectively.
Figure 3:
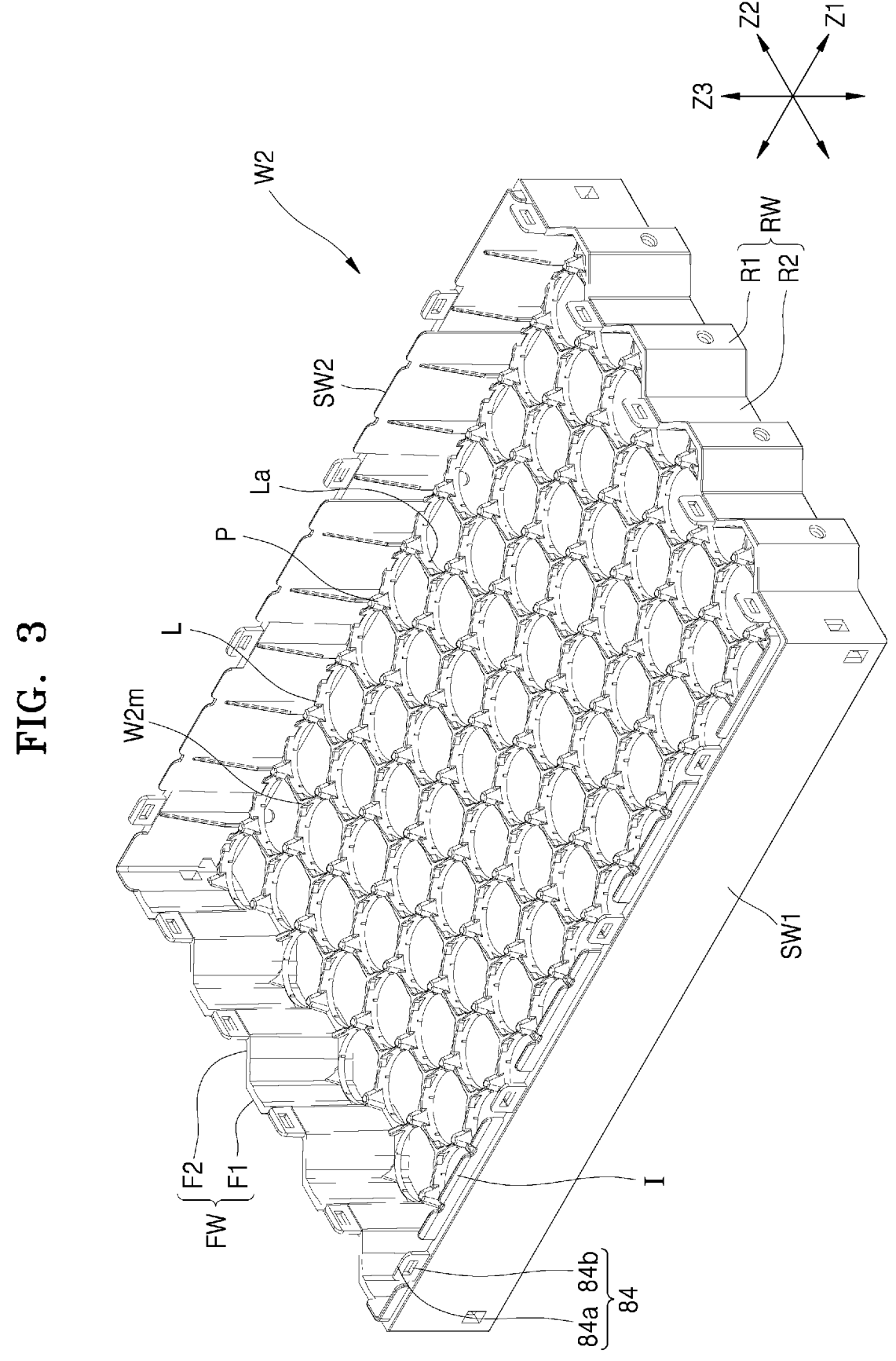
Figure 4:
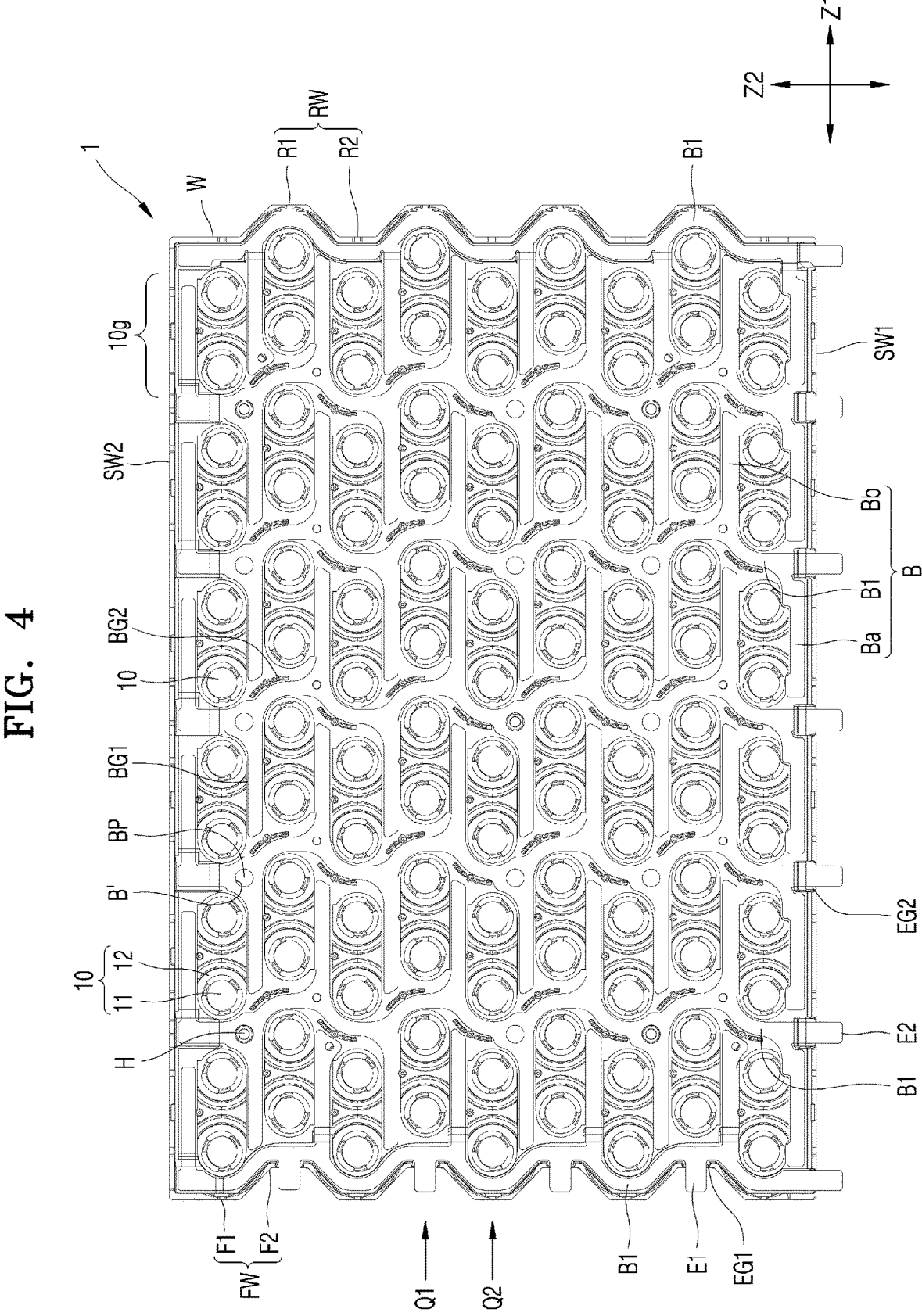
FIG. 4 is a plan view of an arrangement of a bus bar and a battery cell of the battery pack of FIG. 1.
Figure 5:
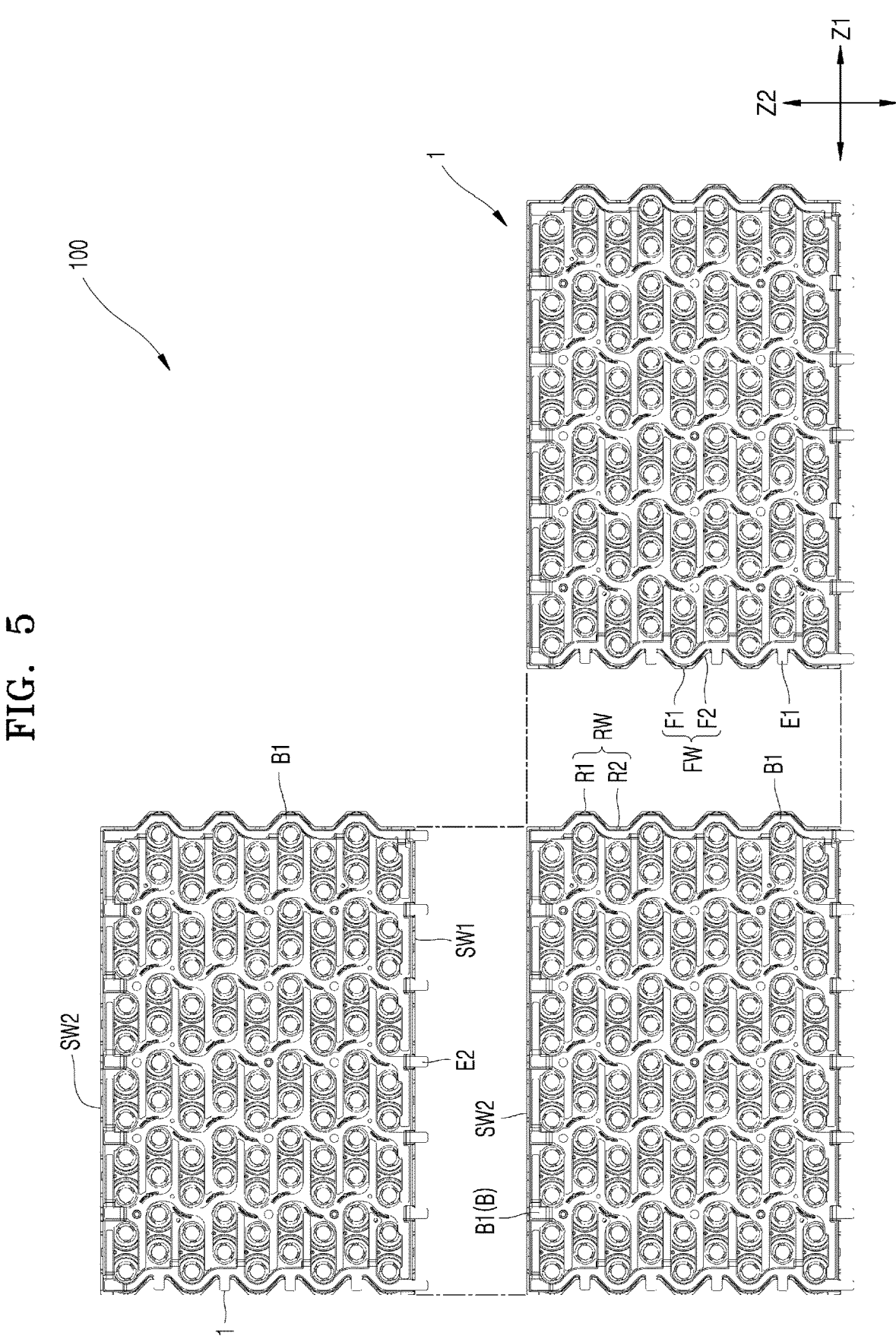
FIG. 5 is a plan view of the battery pack of FIG. 4 expanded in a column direction.
Figure 6:
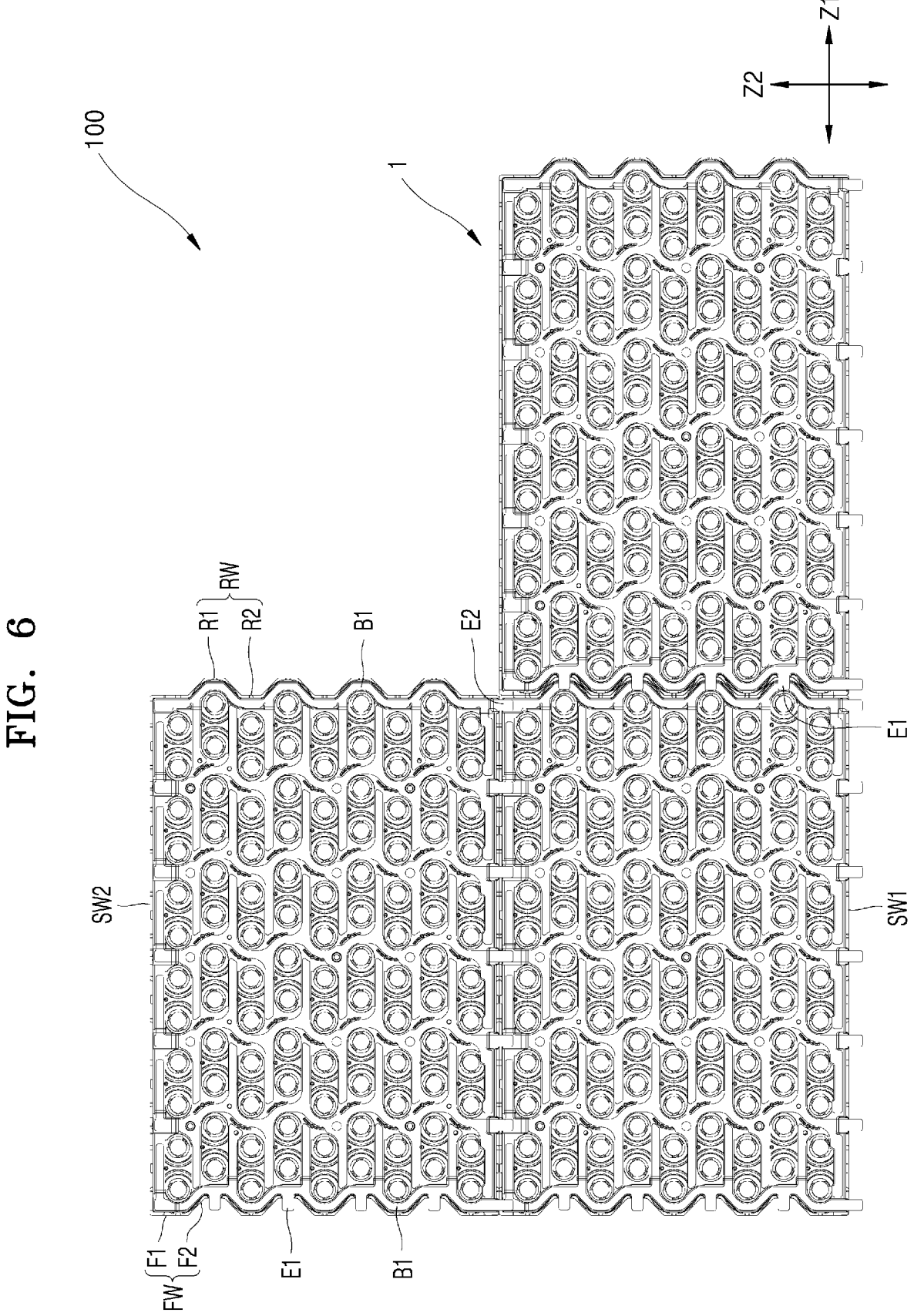
FIG. 6 is a plan view of the battery pack of FIG. 4 expanded in a row direction.

FIG. 1 is an exploded perspective view of a battery pack according to an embodiment of the present disclosure. FIGS. 2 and 3 are perspective views of an upper holder and a lower holder illustrated in FIG. 1, respectively. FIG. 4 is a plan view of an arrangement of a bus bar and a battery cell of the battery pack of FIG. 1. FIG. 5 is a plan view of the battery pack of FIG. 4 expanded in a column direction, and FIG. 6 is a plan view of the battery pack of FIG. 4 expanded in a row direction.

Referring to FIGS. 1 to 4, a battery pack 1 according to an embodiment of the present disclosure may include battery cells 10 arranged in a column direction Z1 in multiple columns such that battery cells 10 in neighboring columns in a row direction Z2 crossing the column direction Z1 are alternately biased toward a forward position or a backward position in the column direction Z1. For example, battery cells 10 in neighboring columns (e.g., adjacent columns) may be offset from each other when viewed in the row direction Z2. The battery pack according to an embodiment of the present disclosure may include cell holders W around (e.g., surrounding) an accommodation space accommodating the battery cells 10. The cell holders W may include a front wall FW and a rear wall RW facing each other in the column direction Z1 with the accommodation space present therebetween, and the cell holders W may have complementary shapes. The battery pack according to an embodiment of the present disclosure may include a bus bar B provided in the accommodation space to connect the battery cells 10 to each other, and extension pieces E1 and E2 extending from the bus bar B to the outside of the accommodation space.

The battery cells 10 may include a unit (e.g., a pack) of the battery cells 10 forming a column while arranged in the column direction Z1 and a plurality of units of the battery cells 10 may form multiple columns of the battery cells 10 while arranged in the row direction Z2 with the battery cells 10 forming each unit arranged in the column direction. Throughout the present specification, when battery cells 10 in neighboring columns are arranged to be alternately biased toward a forward position or a backward position, the column direction Z1 may be understood to refer to a forward/backward direction. In an embodiment of the present disclosure, the column direction Z1 may refer to a direction in which multiple battery cells 10 are arranged in a straight line, and although multiple battery cells 10 may be also arranged in the row direction Z2 crossing the column direction Z1, the battery cells 10 arranged in the row direction Z2 may be considered as being arranged in a zigzag fashion rather than in the straight line. For example, in an embodiment of the present disclosure, the battery cells 10 may be arranged in a straight line in the column direction Z1 and battery cells 10 in neighboring columns are alternately biased toward the forward position or the backward position and thus may be arranged in a zigzag fashion rather than in a straight line in the row direction Z2 crossing the column direction Z1. In an embodiment, the row direction Z2 may be perpendicular to the column direction Z1.

In an embodiment of the present disclosure, arranging battery cells 10 in neighboring columns to be alternately biased toward the forward position or the backward position in the column direction Z1 may be understood to refer to battery cells 10 in a column that are arranged to be inserted into valleys between battery cells 10 in an adjacent column, thereby achieving a dense array of the battery cells 10. For example, battery cells 10 in first and second neighboring columns Q1 and Q2 (e.g., see FIG. 4) are arranged to be alternately biased toward the forward position and the backward position in the column direction Z1, and thus, the battery cells 10 in the first column Q1 may be inserted into valleys between the battery cells 10 in the adjacent second column Q2 in the column direction Z1, and the battery cells 10 in the second column Q2 may be inserted into valleys between the battery cells 10 in the adjacent first column Q1 in the column direction Z1. As described above, because the battery cells 10 in neighboring columns are arranged to be alternately biased toward the forward position or the backward position in the column direction Z1, a larger number of battery cells 10 may be densely arranged in a narrow space and the energy density of the battery pack 1 may be increased.

Referring to FIGS. 1 to 4, in an embodiment of the present disclosure, as battery cells 10 in adjacent columns are arranged in the zigzag fashion, the cell holder W for accommodating the battery cells 10 may be formed in a shape corresponding to the arrangement of the battery cells 10. In an embodiment of the present disclosure, the cell holder W for accommodating the battery cells 10 may include walls around (e.g., surrounding) the accommodation space accommodating the battery cells 10. The walls may include a front wall FW, a rear wall RW facing the front wall FW in the column direction Z1, a first side wall SW1, and a second side wall SW2 facing the first side wall SW1 in the row direction Z2 crossing the column direction Z1. In an embodiment of the present disclosure, the front wall FW may include a first convex portion F1 protruding forward to correspond to a column of battery cells 10 biased toward the forward position, and a first concave portion F2 recessed from a front side to correspond to a column of battery cells 10 biased toward the backward position. The first convex portion F1 and the first concave portion F2 may be alternately provided in the row direction Z2 to correspond to the arrangement of the battery cells 10 alternately biased toward the forward position or the backward position in the row direction Z2. In an embodiment of the present disclosure, the front wall FW may be formed by connecting the first convex portion F1 to the first concave portion F2 in the row direction Z2.

Similar to the front wall FW, the rear wall RW may include a second convex portion R1 protruding backward to correspond to a column of battery cells 10 biased toward the backward position and a second concave portion R2 recessed from a back side to correspond to a column of battery cells 10 biased toward the forward position. The second convex portion R1 and the second concave portion R2 may be alternately provided in the row direction Z2 to correspond to the arrangement of the battery cells 10 alternately biased toward the forward position or the backward position in the row direction Z2. In an embodiment of the present disclosure, the rear wall RW may be formed by connecting the second convex portion R1 to the second concave portion R2 in the row direction Z2.

In an embodiment of the present disclosure, arranging a column of battery cells 10 to be biased toward the forward position may be understood to refer to the front wall FW corresponding to the column including the first convex portion F1 and the rear wall RW corresponding to the column including the second concave portion R2. As described above, in an embodiment of the present disclosure, the first convex portion F1 of the front wall FW and the second concave portion R2 of the rear wall RW may be formed in the same column to have complementary shapes to be inserted into each other. Similarly, arranging a column of battery cells 10 to be biased toward the backward position may be understood to refer to the front wall FW corresponding to the column including the first concave portion F2 and the rear wall RW corresponding to the column including the second convex portion R1. As described above, in an embodiment of the present disclosure, the first concave portion F2 of the front wall FW and the second convex portion R1 of the rear wall RW may be formed in the same column to have complementary shapes to be inserted into each other.

In an embodiment of the present disclosure, forming the first convex portion F1 of the front wall FW and the second concave portion R2 of the rear wall RW in the same column to have complementary shapes to be inserted into each other and forming the first concave portion F2 of the front wall FW and the second convex portion R1 of the rear wall RW in the same column to have complementary shapes to be inserted into each other may be used to provide a module 100 with various suitable outputs and capacities (see FIGS. 5 and 6). For example, the module 100 may include a plurality of the battery packs 1, each battery pack 1 with the same structure representing one unit and connecting to each other. In this case, various suitable outputs and capacities may be adaptively achieved using the battery packs 1 having the same structure by increasing or reducing the number of battery packs 1 to be included or connected in the module 100, thereby achieving scalability of the battery pack 1.

In an embodiment of the present disclosure, unlike the front wall FW and the rear wall RW, the first and second side walls SW1 and SW2 may be formed to be flat, and a module 100 may be expanded to include multiple battery packs 1 in the row direction Z2 such that the first and second side walls SW1 and SW2 of the battery pack 1, which are neighboring each other in the row direction Z2, are in contact with each other through a flat outer surface.

Referring to FIGS. 5 and 6, in a module 100 expanded to include multiple battery packs 1, neighboring battery packs 1 may be combined with each other. Here, the combining of the neighboring battery packs 1 may be understood to refer to a front wall FW of one battery pack 1 and a rear wall RW of another battery pack 1 neighboring the battery pack 1 being combined with each other, and the front wall FW of the battery pack 1 and the rear wall RW of the other battery pack 1 being formed to have complementary structures so that a first convex portion F1 and a first concave portion F2 of the front wall FW of the battery pack 1 may be inserted into a second concave portion R2 and a second convex portion R1 of the rear wall RW of the other battery pack 1. In the module 100 expanded to include multiple battery packs 1 having the same structure where one battery pack 1 is set to one unit, in order to combine adjacent battery packs 1 with each other, a front wall FW and a rear wall RW of the same battery pack 1 may have complementary shapes, and a front wall FW and a rear wall RW in the same column of the same battery pack 1 may include a first convex portion F1 and a second concave portion R2 having complementary shapes or a concave portion F2 and a second convex portion R1 having complementary shapes.

For example, in order to provide scalability of the battery pack 1 by using the battery packs 1 having the same structure, adjacent battery packs 1 may be arranged in the same orientation and thus a rear wall RW of a front battery pack 1 and a front wall FW of a rear battery pack 1 having complementary shapes to be inserted into each other may be combined with each other.

Referring to FIG. 4, the multiple battery cells 10 may be connected (e.g., electrically connected) to each other through a bus bar B. More specifically, different battery cells 10 may be connected in parallel by connecting different battery cells 10 with the same polarity through the bus bar B or connected in series by connecting different battery cells 10 with different polarities through the bus bar B. The battery cell 10 may include first and second electrodes 11 and 12 with different polarities, and in an embodiment of the present disclosure, the first and second electrodes 11 and 12 may be formed on an upper end of the battery cell 10 in a height direction Z3 crossing the column direction Z1 and the row direction Z2. In an embodiment, the height direction Z3 may be perpendicular to the column direction Z1 and the row direction Z2. For example, the height direction Z3 may correspond to a longitudinal direction of the battery cell 10. In this case, the first electrode 11 may be formed at a center position on the upper end of the battery cell 10, and the second electrode 12 may be formed at an edge position on the upper end of the battery cell 10 around (e.g., surrounding) the first electrode 11. The second electrode 12 may extend downward from the edge position on the upper end of the battery cell 10 in the height direction Z3 to be formed on an entire lower end of the battery cell 10 while forming a side surface between the upper end and the lower end of the battery cell 10.

In an embodiment of the present disclosure, through the bus bar B, a group of battery cells 10*g*, including multiple neighboring battery cells 10, may be connected in parallel, and different groups of battery cells 10*g* neighboring each other may be connected in series, thereby connecting multiple battery cells 10 in series and parallel. In various embodiments of the present disclosure, the number of battery cells 10 constituting a group of battery cells 10*g* connected in parallel, the number of battery cells 10 constituting a group of battery cells 10*g* connected in series, and/or the like may be designed adaptively to a desired battery output and capacity.

In an embodiment of the present disclosure, multiple groups of battery cells 10*g* each connected in parallel may be arranged in the column direction Z1, different groups of battery cells 10*g* adjacent to each other in the column direction Z1 may be connected in series, and a main body B1 of the bus bar B may extend between adjacent groups of battery cells 10*g* in the column direction Z1. More specifically, the bus bar B may include the main body B1 extending between adjacent groups of battery cells 10*g* in the column direction Z1, and first and second branch portions Ba and Bb extending from the main body B1 toward each group of battery cells 10*g* adjacent to each other with respect to the main body B1 as a boundary. In an embodiment, the first and second branch portions Ba and Bb may extend away from the main body B1 in opposite directions from each other. The main body B1 of the bus bar B may be arranged in a zigzag form between adjacent groups of battery cells 10*g* in the column direction Z1 and may extend in the row direction Z2. A group of battery cells 10*g* connected in parallel may include a row of battery cells 10 arranged in a zigzag line, and the main body B1 of the bus bar B extending along a boundary of adjacent groups of battery cells 10*g* each connected in parallel may extend in a zigzag line between the row of the battery cells 10 arranged in the zigzag line.

The main body B1 of the bus bar B may electrically connect the first and second branch portions Ba and Bb extending from the main body B1. For example, the first and second branch portions Ba and Bb may extend from the main body B1 toward different groups of battery cells 10 arranged at opposite sides of the main body B1 in the column direction Z1. In an embodiment of the present disclosure, the first and second branch portions Ba and Bb may extend in the column direction Z1 and extend in a straight line between the battery cells 10 arranged in a straight line in the column direction Z1. For example, the first and second branch portions Ba and Bb may extend from the main body B1 of the bus bar B in opposite column directions Z1 and be alternately formed at alternate positions in the row direction Z2. For example, the first and second branch portions Ba and Bb may extend between columns of battery cells 10 adjacent to each other along the main body B1 extending in the zigzag line in the row direction Z2, and extend in the column direction Z1 from alternate positions in the row direction Z2 to between columns of battery cells 10.

In an embodiment of the present disclosure, multiple groups of battery cells 10*g* each connected in parallel may be arranged in the column direction Z1, and the main body B1 of the bus bar B may be arranged between adjacent groups of battery cells 10*g* arranged in the column direction Z1. For example, multiple main bodies B1 of the bus bars B may be arranged in the column direction Z1, and first and second branch portions Ba and Bb extending from main bodies B1 of bus bars B toward a group of battery cells 10*g* arranged between main bodies B1 of neighboring bus bars B may be in the form of combs to be inserted into each other. In an embodiment of the present disclosure, first and second branch portions Ba and Bb extending from main bodies B1 of neighboring bus bars B may be inserted into each other without physical interference, and thus may extend from alternate positions from the main bodies B1 of the bus bars B, which extend in a zigzag line in the row direction Z2, in the row direction Z2.

In an embodiment of the present disclosure, connecting (e.g., electrically connecting) multiple battery cells 10 may be understood to include connecting the multiple battery cells 10 in parallel, in series or in both parallel and series. For example, in an embodiment of the present disclosure, multiple battery cells 10 may be connected (e.g., electrically connected) in both series and parallel by connecting a group of battery cells 10*g*, which are connected in parallel, and another group of battery cells 10*g*, which are connected in series, in series among the multiple battery cells 10.

More specifically, through multiple bus bars B arranged on the battery cell 10, a group of neighboring battery cells 10*g* may be connected in parallel and connected to another group of battery cells 10*g* in series. In an embodiment of the present disclosure, multiple battery cells 10 arranged in the column direction Z1 and the row direction Z2 may include multiple battery cells 10 arranged in a straight line in the column direction Z1 and multiple battery cells 10 arranged in a zigzag line in the row direction Z2. In this case, the bus bar B may connect two rows of battery cells 10, which are arranged in the zigzag line, in parallel, and for example, two rows of neighboring battery cells 10 may be connected in parallel to connect a group of battery cells 10*g*, including the two rows of neighboring battery cells 10*g*, in parallel. In an embodiment, the bus bar B may connect two rows of neighboring battery cells 10 in parallel to form a group of battery cells 10*g* connected in parallel, and the bus bar B may connect adjacent groups of battery cells 10*g* in the column direction Z1 in series where each unit of two rows of neighboring battery cells 10 are connected in parallel, thereby connecting (e.g., electrically connecting) multiple battery cells 10, which are arranged in the column direction Z1 and the row direction Z2, in both series and parallel. For example, in an embodiment of the present disclosure, when a group of battery cells 10*g* are formed by connecting, in parallel, two rows of battery cells 10 connected in parallel, a total of six groups of battery cells 10*g* may be formed in the column direction Z1. In this case, a group of battery cells 10*g* connected in parallel and another group of battery cells 10*g* neighboring thereto in the column direction Z1 may be arranged to be adjacent to each other with the main body B1 of the bus bar B therebetween, and there may be a total of six groups of battery cells 10*g*, i.e., six groups of battery cells 10*g* connected in parallel, with main bodies B1 of a total of five bus bars B therebetween. More specifically, in an embodiment of the present disclosure, a group of battery cells 10*g* connected in parallel includes two rows of neighboring battery cells 10 and each of the two rows of battery cells 10 includes nine battery cells 10 arranged in a zigzag line, and thus, a total of eighteen battery cells 10 may be included in the group of battery cells 10*g* connected in parallel. In an embodiment of the present disclosure, when eighteen battery cells 10 connected in parallel are set to a group of battery cells 10*g* and a total of six groups of battery cells $10g$ are connected in series in the column direction Z1, a structure in which eighteen battery cells 10 are set to a unit and a total of six units are connected in series, i.e., a 6S18P electrical connection, may be achieved. In the 6S18P electrical connection according to an embodiment of the present disclosure, a group of battery cells $10g$ including eighteen battery cells 10 connected in parallel may include two rows of battery cells 10 and each of the two rows of battery cells 10 may include nine battery cells 10. In an embodiment of the present disclosure, according to the number and arrangement of battery cells $10g$ of one group and connected in parallel, the battery pack 1 may include four protruding walls (first convex portions F1 or second convex portions R1) protruding in the column direction Z1. In an embodiment of the present disclosure, the protruding walls (e.g., the first or second convex portions F1 or R1) may be provided on at least one of the front wall FW or the rear wall RW in the column direction Z1, and for example, in an embodiment of the present disclosure, the four protruding walls (e.g., the first or second convex portion F1 or R1) may be provided on the front wall FW or the rear wall RW. Throughout the present specification, when the front wall FW or the rear wall RW includes four protruding walls (first or second convex portions F1 or R1) in the column direction Z1, the number of protruding walls (e.g., the first or second convex portions F1 or R1) may refer to the total number of protruding walls (e.g., the first or second convex portions F1 or R1) on the front wall FW or the rear wall RW, the number of protruding walls (e.g., the first convex portions F1) protruding from the front wall FW toward the outside, i.e., in a forward direction, or the number of protruding walls (e.g., the second convex portions R1) protruding from the rear wall RW toward the outside, i.e., in a backward direction. In an embodiment of the present disclosure, when the rear wall RW includes four protruding walls (second convex portions R1), the four protruding walls (e.g., the second convex portions R1) may refer to a total number of protruding walls (second convex portions R1) on the rear wall RW, and may be understood to refer to, for example, the number of protruding walls (second convex portions R1) protruding from the rear wall RW toward the outside, i.e., in the backward direction, being four, excluding that the rear wall RW includes less than or greater than four protruding walls (second convex portions R1).

In various embodiments of the present disclosure, a total number of battery cells 10 of the battery pack 1, the number of battery cells 10 connected in parallel or series, and/or the like may be variously changed according to a desired or suitable output and capacity of the battery pack 1. More generally, when the battery pack 1 of the present disclosure includes multiple battery cells 10 forming an mSnP electrical connection, a group of battery cells $10g$ connected in parallel may include n battery packs 1 and the battery pack 1 may entirely have a structure in which m units each including n battery cells 10 connected in parallel are connected in series. In this case, when a group of battery cells $10g$ includes n battery cells 10 connected in parallel, the group of battery cells $10g$ including the n battery cells 10 may be arranged in L rows and each row of battery cells 10 may include K battery cells 10. In this case, the number of protruding walls (first or second convex portions F1 or R1) protruding toward the outside from the front wall FW or the rear wall RW in the column direction Z1 may be determined according to whether K is an even number or an odd number, and the number of protruding walls (first or second convex portions F1 or R1) protruding toward the outside from the front wall FW, the rear wall RW, or more generally, a wall of a cell holder W may be determined by the following relation:

i) when K is an even number, the number of protruding walls (first or second convex portions F1 or R1) is K/2, and ii) when K is an odd number, the number of protruding walls (first or second convex portions F1 or R1) is (K−1)/2.

In an embodiment of the present disclosure, multiple battery cells 10 may include multiple battery cells 10 arranged in the column direction Z1, and battery cells in neighboring columns may be alternately arranged at a forward position or a backward position in the column direction Z1. In this case, a row of battery cells 10 protruding at the forward or backward position in the column direction Z1 may form a protruding wall (e.g., a first or second convex portion F1 or R1) protruding to the forward or backward position from a cell holder W accommodating the battery cells 10. In this case, when the number K of battery cells 10 in a row is an even number, the number of protruding walls (first or second convex portions F1 or R1) may be determined to be K/2 according to an array of battery cells 10 arranged alternately at a forward position or a backward position in the column direction Z1, and for example, K/2 protruding walls (first or second convex portions F1 or R1) may be formed on both the front wall FW and the rear wall RW. In contrast, when the number K of battery cells 10 in a row is an odd number, the number of protruding walls (first or second convex portions F1 or R1) may be determined to be (K−1)/2 according to an array of battery cells 10 arranged alternately at a forward position or a backward position in the column direction Z1, and for example, (K−1)/2 protruding walls (first or second convex portions F1 or R1) may be formed on the front wall FW or the rear wall RW. For example, when the battery pack 1 according to an embodiment of the present disclosure forms an mSnP electrical connection, a group of battery cells $10g$ including n battery cells 10 connected in parallel is set to a unit and a total of m units are arranged in the column direction Z1 to connect m neighboring units in series in the column direction Z1. When a group of battery cells $10g$ including n battery cells 10 connected in parallel are arranged in L rows and each row of battery cells 10 includes K battery cells 10, the number of protruding walls (first or second convex portions F1 or R1) protruding from a wall of a cell holder W may be determined according to the number K of battery cells 10 in each row. In an embodiment of the present disclosure, according to the number K of battery cells 10 in each row, K/2 protruding walls (first or second convex portions F1 or R1) may be provided on both the front wall FW and the rear wall RW in the column direction Z1 or (K−1)/2 protruding walls (first or second convex portions F1 or R1) may be provided on the front wall FW or the rear wall RW.

In an embodiment of the present disclosure, main bodies B1 of bus bars B may be arranged in the column direction Z1 and each of the main bodies B1 may extend in a zigzag line in the row direction Z2. As described below, a foremost main body B1 and a rearmost main body B1 may be provided in the column direction Z1 to respectively match the front wall FW and the rear wall RW.

More specifically, the foremost main body B1 and the front wall FW may include a first convex portion F1 protruding forward to correspond to a column of battery cells 10 biased forward and a first concave portion F2 recessed from a front side to correspond to a column of neighboring battery cells biased backward, and as described above, the first convex portion F1 and the first concave portion F2 may be alternately arranged in the row direction Z2 and extend in a zigzag form (e.g., a first zigzag form) in the row direction Z2. Similarly, the rearmost main body B1 and the rear wall RW may include a second convex portion R1 protruding backward to correspond to a column of battery cells 10 biased backward and a second concave portion R2 recessed from a back side to correspond to a column of neighboring battery cells biased forward, and as described above, the second convex portion R1 and the second concave portion R2 may be alternately arranged in the row direction Z2 and extend in a zigzag form (e.g., a second zigzag form) in the row direction Z2.

The zigzag form (e.g., the first zigzag form) of the foremost main body B1 and the front wall FW and the zigzag form (e.g., the second zigzag form) of the rearmost main body B1 and the rear wall RW are complementary to each other, and thus, the foremost main body B1 and the rearmost main body B1 may be combined with each other in a complementary manner and the front wall FW and the rear wall RW may be combined with each other in a complementary manner. Due to the complementary combination of the foremost main body B1 and the rearmost main body B1, the foremost main body B1 and the rearmost main body B1 may be connected (e.g., electrically connected) through a first extension piece E1 of the foremost main body B1 or the rearmost main body B1 as described below and thus neighboring battery packs 1 of the module 100 extending in the column direction Z1 may be connected (e.g., electrically connected). In an embodiment, due to the complementary combination of the front wall FW and the rear wall RW, the front wall FW and the rear wall RW may be inserted into each other to physically connect neighboring battery packs 1 of the module 100 extending in the column direction Z1.

In an embodiment of the present disclosure, the first branch portion Ba may extend toward a group of battery cells 10g arranged at one side of the main body B1 of the bus bar B among the group of battery cells 10g arranged at the one side of the main body B1 of the bus bar B and a group of battery cells 10g arranged at another side of the main body B1 of the bus bar B, thereby connecting the group of battery cells 10g arranged at the one side of the main body B1 of the bus bar B in parallel, and the second branch portion Bb may extend toward the group of battery cells 10g arranged at the other side of the main body B1 of the bus bar B, thereby connecting the group of battery cells 10g arranged at the other side of the main body B1 of the bus bar B in parallel. In this case, the main body B1 of the bus bar B may connect the first and second branch portions Ba and Bb to connect in series the group of battery cells 10g arranged at the one side of the main body B1 of the bus bar B and connected to the first branch portion B1 and the group of battery cells 10g arranged at the other side of the main body B1 of the bus bar B and connected to the second branch portion Bb.

In an embodiment of the present disclosure, when the first branch portion Ba connects a group of battery cells 10g at one side of the main body B1 of the bus bar B in parallel, the second branch portion Bb connects a group of battery cells 10g at another side of the main body B1 of the bus bar B in parallel, or the main body B1 connecting the first and second branch portions Ba and Bb connects the group of battery cells 10g at the one side of the main body B1 of the bus bar B and the group of battery cells 10g at the other side of the main body B1 of the bus bar B in series, it may be understood to refer to connecting the battery cells 10 in parallel or series through a connection member 50 (see FIG.

16) connected to the bus bar B rather than connecting the battery cells 10 in parallel or series through the bus bar B.

In an embodiment of the present disclosure, the connection member 50 (e.g., a portion of the connection member 50) may be between a bus bar B and a battery cell 10 to connect the bus bar B to the battery cell 10. In an embodiment of the present disclosure, the connection member 50 may include a conductive wire or a conductive ribbon and be connected between the bus bar B and the battery cell 10 by wire bonding or ribbon bonding. More specifically, the connection member 50 may be connected between the bus bar B and electrodes 11 and 12 of the battery cell 10 to connect the bus bar B and the electrodes 11 and 12 of the battery cell 10, and in this case, in relation to series connection or parallel connection, different battery cells 10 may be connected in parallel by connecting electrodes 11 thereof and connecting electrodes 12 thereof through the connection member 50 or may be connected in series by respectively connecting the electrode 11 and the electrode 12 of one of the battery cells 10 to the electrode 12 and the electrode 11 of the other battery cell 10 through the connection member 50. Referring to FIG. 4, the connection member 50 may connect in parallel a group of battery cells 10g arranged at one side of the main body B1 of the bus bar B by connecting the same polarities of the group of battery cells 10g to the first branch portion Ba, and connect in parallel a group of battery cells 10g arranged at another side of the main body B1 of the bus bar B by connecting the same polarities of the group of battery cells 10g to the second branch portion Bb.

The bus bar B may be provided in an accommodation space accommodating multiple battery cells 10 to connect the multiple battery cells 10, and extension pieces E1 and E2 extending from the bus bar B may be provided outside the accommodation space. The extension pieces E1 and E2 may electrically connect neighboring battery packs 1 in a module 100 expanded to include multiple battery packs 1. More specifically, the extension pieces E1 and E2 may extend from the bus bar B in the column direction Z1 and the row direction Z2, may extend from the accommodation space including the bus bar B to the outside of the accommodation space, and may protrude to the outside of a cell holder W around (e.g., surrounding) the accommodation space.

The extension pieces E1 and E2 may include a first extension piece E1 extending from the bus bar B in the column direction Z1 and a second extension piece E2 extending from the bus bar B in the row direction Z2. The first and second extension pieces E1 and E2 may provide scalability in the column direction Z1 and the row direction Z2 while extending from the bus bar B in the column direction Z1 and the row direction Z2, and for example, provide a module 100 expanded in the column direction Z1 and the row direction Z2 to include multiple battery packs 1 in the column direction Z1 and the row direction Z2. For example, in the module 100 expanded in the column direction Z1 and the row direction Z2, the first extension piece E1 may connect neighboring battery packs 1 in the column direction Z1 and the second extension piece E2 may connect neighboring battery packs 1 in the row direction Z2.

The first and second extension pieces E1 and E2 may extend from the bus bar B located in the accommodation space accommodating multiple battery cells 10 to the outside of the accommodation space, and may protrude, for example, from the cell holder W around (e.g., surrounding) the accommodation space. Referring to FIGS. 5 and 6, in a module 100 expanded to include multiple battery packs 1, first and second extension pieces E1 and E2 protruding from a battery pack 1 among neighboring battery packs 1 are accommodated in the other battery pack 1 and thus first and second extension pieces E1 and E2 of the other battery pack 1 and a bus bar B may be connected to each other, thereby achieving an expanded output and capacity of the module 100 through the connection of the neighboring battery packs 1.

The first and second extension pieces E1 and E2 may extend from the bus bar B in different column directions Z1 and different row directions Z2. In relation to the first extension piece E1, a module 100 may be expanded in the column direction Z1 such that in neighboring battery packs 1 in the column direction Z1, a group of battery cells 10$g$ connected in parallel is set to a unit, the number of units connected in series is increased in the column direction Z1, and the first extension piece E1 extends in the column direction Z1 to connect neighboring battery packs 1 in the column direction Z1 and connect, for example, bus bars B connected to a group of battery cells 10$g$ forming a boundary between neighboring battery packs 1 in the column direction Z1. In relation to the second extension piece E2, in a module 100 expanded in the row direction Z2, neighboring battery packs 1 in the row direction Z2 may expand a row of battery cells 10 in the row direction Z2, and the second extension piece E2 may connect rows of battery cells 10 forming a boundary between neighboring battery packs 1 in the row direction Z2, and connect, for example, bus bars B connected to rows of battery cells 10 forming a boundary between neighboring battery packs 1 in the row direction Z2, thereby connecting rows of battery cells 10 expanded in the row direction Z2 in parallel.

The first extension piece E1 may expand series connection of a group of neighboring battery cells 10$g$ in the column direction Z1 in a battery pack 1 to a module 100 including multiple battery packs 1 arranged in the column direction Z1, and the second extension piece E2 may expand parallel connection of a group of neighboring battery cells 10 in the row direction Z2 in a battery pack 1 to a module 100 including multiple battery packs 1 arranged in the row direction Z2.

The first and second extension pieces E1 and E2 may extend from a bus bar B located in an accommodation space accommodating multiple battery cells 10 in the column direction Z1 and the row direction Z, and may extend, for example, from different points on the bus bar B. In an embodiment of the present disclosure, the first extension piece E1 may extend from an outermost bus bar B in the column direction Z1, and extend, for example, from a foremost main body B1 or a rearmost main body B1. In an embodiment of the present disclosure, the first extension piece E1 may extend from the foremost main body B1 in the column direction Z1. For example, the foremost main body B1 and a front wall FW may extend in zigzag forms matching each other and include a first convex portion F1 protruding forward in the column direction Z1 and a first concave portion F2 recessed from a front side, and the first convex portion F1 and the first concave portion F2 may be alternately provided at alternate positions in the row direction Z2. In this case, the first extension piece E1 may be provided at a position of the first concave portion F2 of the foremost main body B1, and multiple extension pieces E1 may be provided at the position of the first concave portion F2 in the row direction Z2. Referring to FIG. 5, in the module 100 expanded in the column direction Z1, the front wall FW (e.g., the first concave portion F2) and the rear wall RW (e.g., the second convex portion R1) are inserted into each other to bring the first extension piece E1 at the position of the first concave portion F2 of the front wall FW into contact with the main body B1 of the bus bar B at the position of the second convex portion R1 of the front wall FW, thereby connecting (e.g., electrically connecting) neighboring battery packs 1 in the column direction Z1. For example, the first extension piece E1 connects a rearmost bus bar B of a front battery pack 1 to a foremost bus bar B of a rear battery pack 1 among the front and rear battery packs 1 neighboring each other in the column direction Z1, thereby connecting (e.g., electrically connecting) the front and rear battery packs 1 to each other.

In an embodiment of the present disclosure, the front wall FW with the first extension piece E1 among the front wall FW and the rear wall RW may be defined as a first extension side FW (e.g., a front wall), and the rear wall RW with no first extension piece E1 may be defined as a first reception side RW (corresponding to a rear wall). Throughout the present specification, an extension side may be defined as a wall adjacent to a position of the first or second extension piece E1 or E2 for connection of neighboring battery packs 1 in the column direction Z1 and the row direction Z2 or the positions of the first and second extension pieces E1 and E2 for expansion in the column direction Z1 or the row direction Z2. In an embodiment of the present disclosure, the first extension side FW (e.g., the front wall) and the first reception side RW (e.g., the rear wall) may refer to a front wall FW and a rear wall RW provided at positions facing in the column direction Z1. As described below, in relation to the second extension piece E2, a first side wall SW1 with the second extension piece E2 may be defined as a second extension side SW1 (e.g., a first side wall), a second side wall with no second extension piece E2 may be defined as a second reception side SW2 (e.g., a second side wall), and the second extension side SW1 (e.g., the first side wall) and the second reception side SW2 (e.g., the second side wall) may be understood as the first and second side walls SW1 and SW2 located at opposite positions in the row direction Z2.

In an embodiment of the present disclosure, the second extension piece E2 may extend from an outermost point on a bus bar B in the row direction Z2 or extend from an outermost point on a bus bar B adjacent to the first or second side wall SW1 or SW2 in the row direction Z2. In an embodiment of the present disclosure, the second extension piece E2 may extend from an outermost point on a bus bar B adjacent to the first side wall SW1. Multiple second extension pieces E2 may extend from multiple bus bars B, which are arranged in the column direction Z1, in the row direction Z2. In an embodiment of the present disclosure, the multiple second extension pieces E2 may extend from main bodies B1 of multiple bus bars B arranged in the column direction Z1. The main bodies B1 of the bus bars B may extend in a zigzag form in the row direction Z2, and the second extension pieces E2 may extend in a straight line from the outermost point on a corresponding main body B1 adjacent to the first side wall SW1 in the row direction Z2. Referring to FIG. 5, in the module 100 expanded in the row direction Z2, the first side wall SW1 and the second side wall SW2 are in contact with each other and thus the second extension piece E2 adjacent to the first side wall SW1 is in contact with a main body B1 of a bus bar B adjacent to the second side wall SW2, thereby connecting (e.g., electrically connecting) neighboring battery packs 1 in the row direction Z2.

In an embodiment of the present disclosure, the first side wall SW1 with the second extension piece E2 among the first side wall SW1 and the second wall SW2 may be defined as a second extension side SW1 (e.g., a first side wall), and the side wall SW2 with no second extension piece E2 may be defined as a second reception side SW2 (e.g., a second side wall). For example, the second extension side SW1 (e.g., the first side wall) and the second reception side SW2 (e.g., the second side wall) may refer to the first and second side walls SW1 and SW2 located at opposite positions in the row direction Z2.

Figure 7:
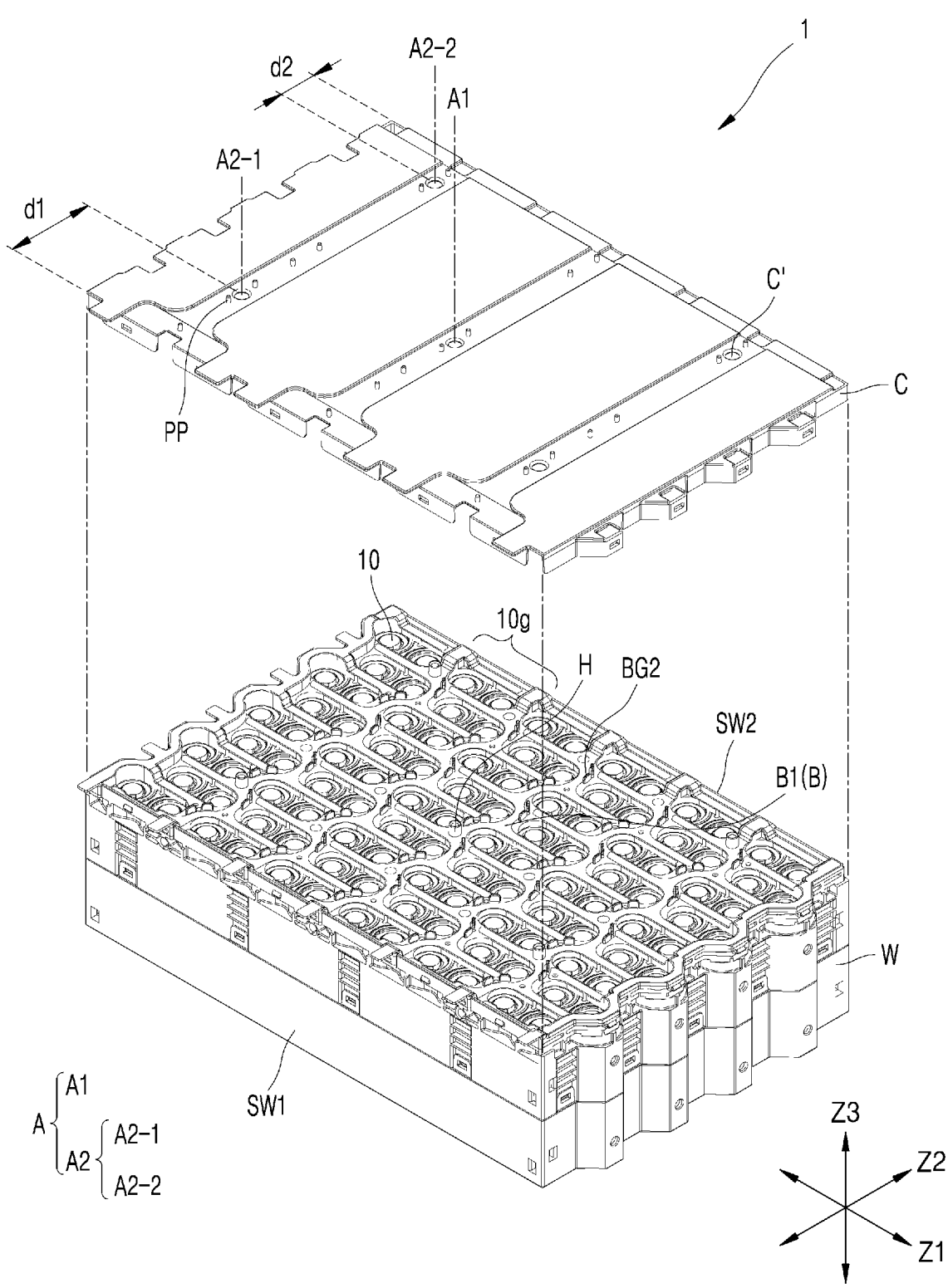
FIG. 7 is an exploded perspective view of a battery pack according to an embodiment of the present disclosure, provided to describe an assembly of a thermistor.
Figure 8:
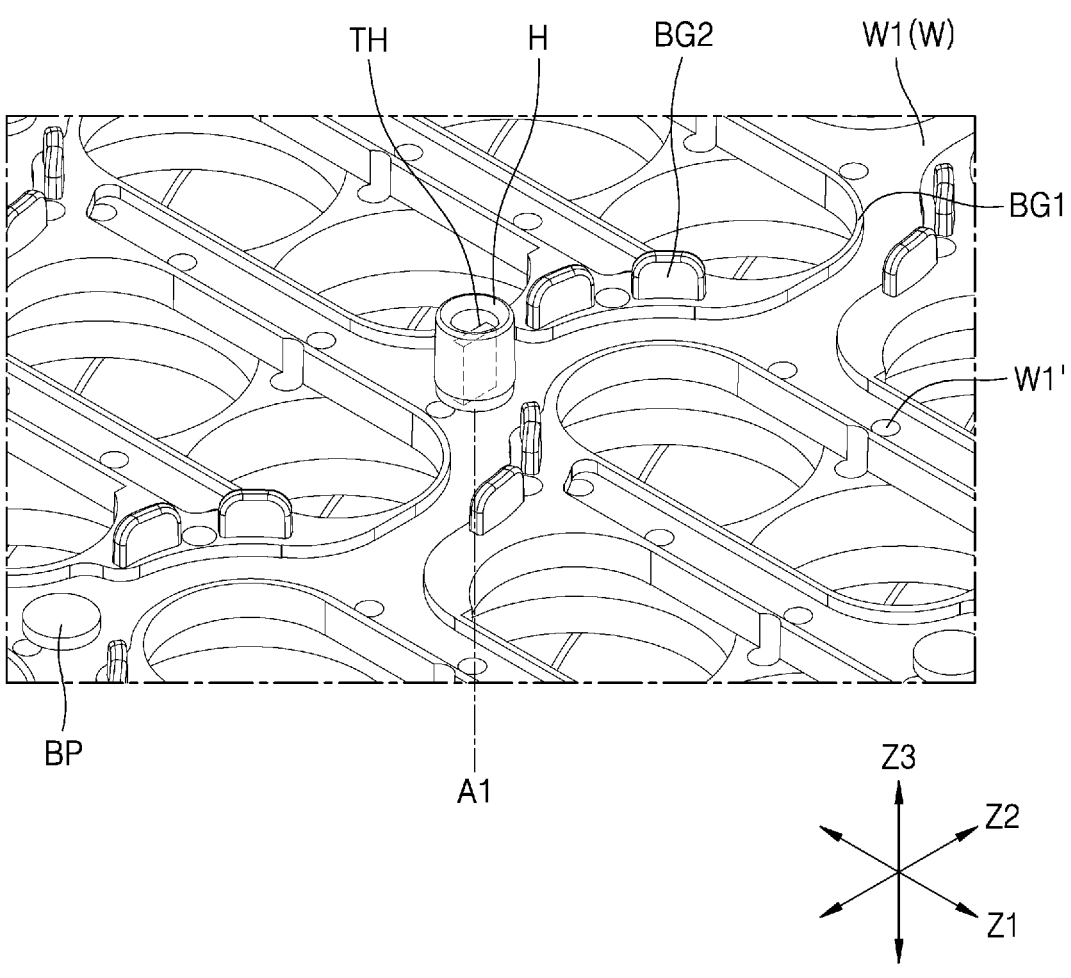
FIG. 8 is an enlarged perspective view of a part of an upper holder of FIG. 7.
Figure 9:
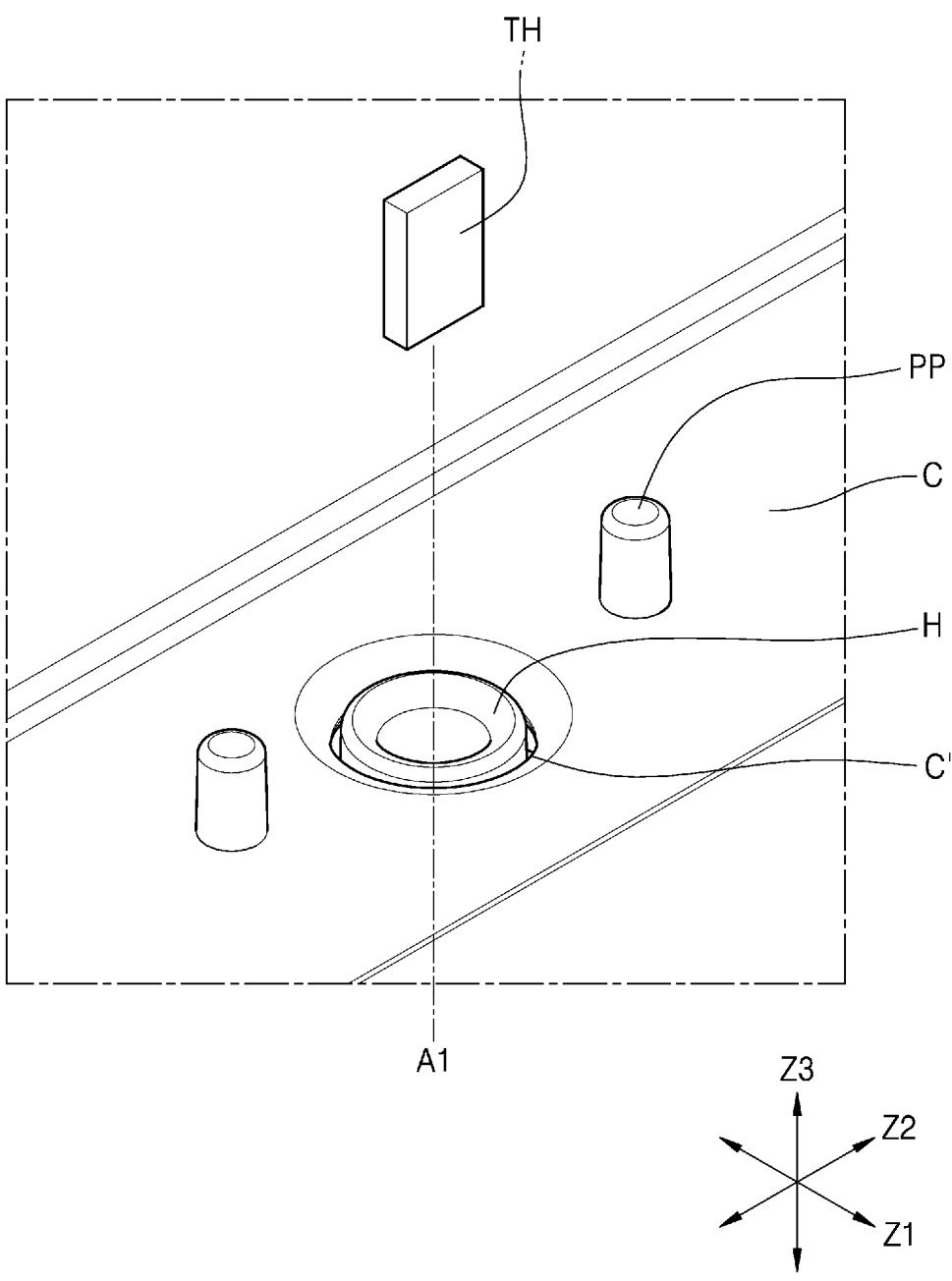
FIG. 9 is a perspective view showing a state in which a cover of FIG. 7 is assembled on the upper holder of FIG. 8.
Figure 10:
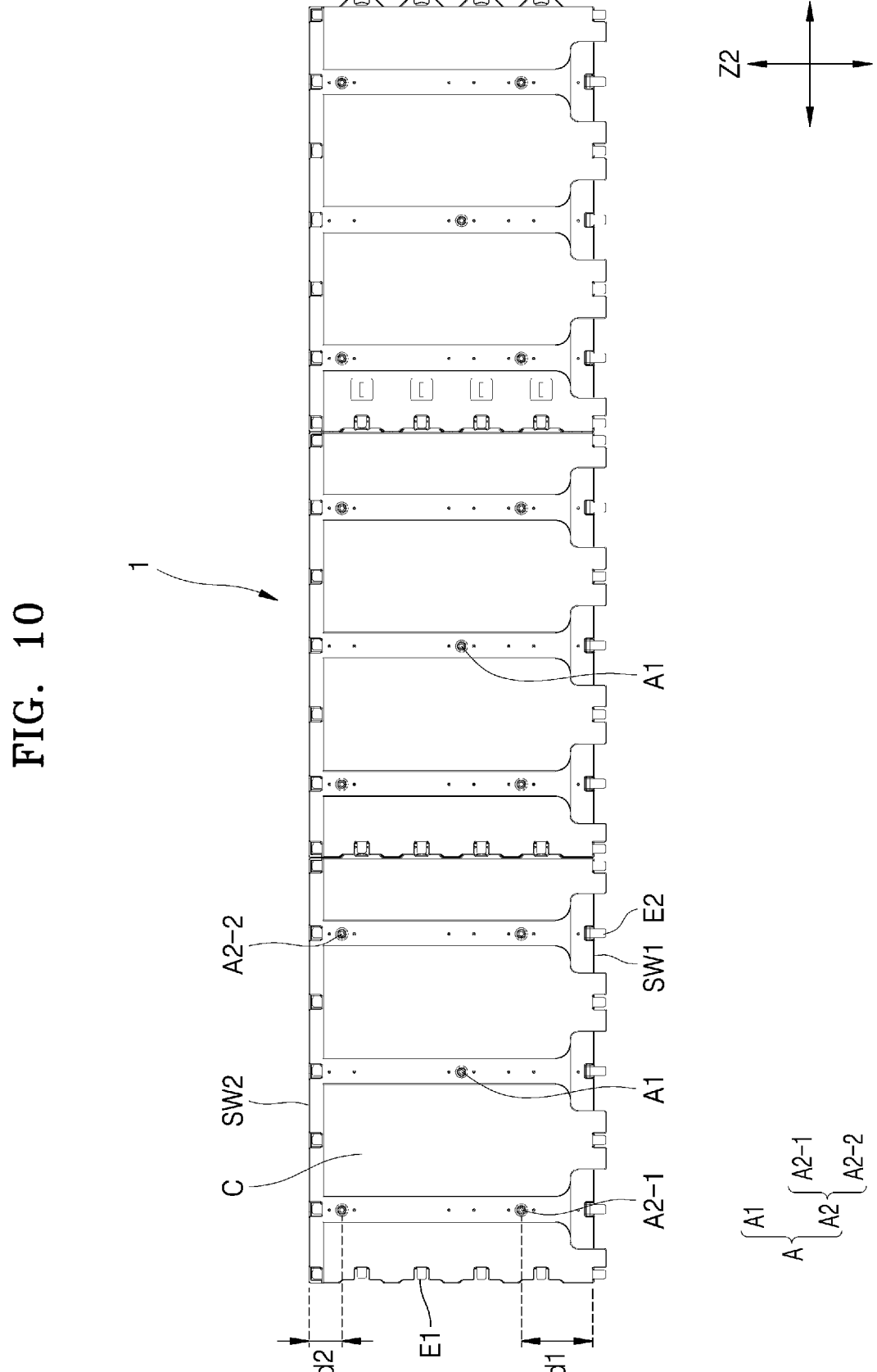
FIG. 10 is a plan view for describing an arrangement of a thermistor in a module in which battery packs according to the present disclosure are expanded in a column direction.
Figure 11:
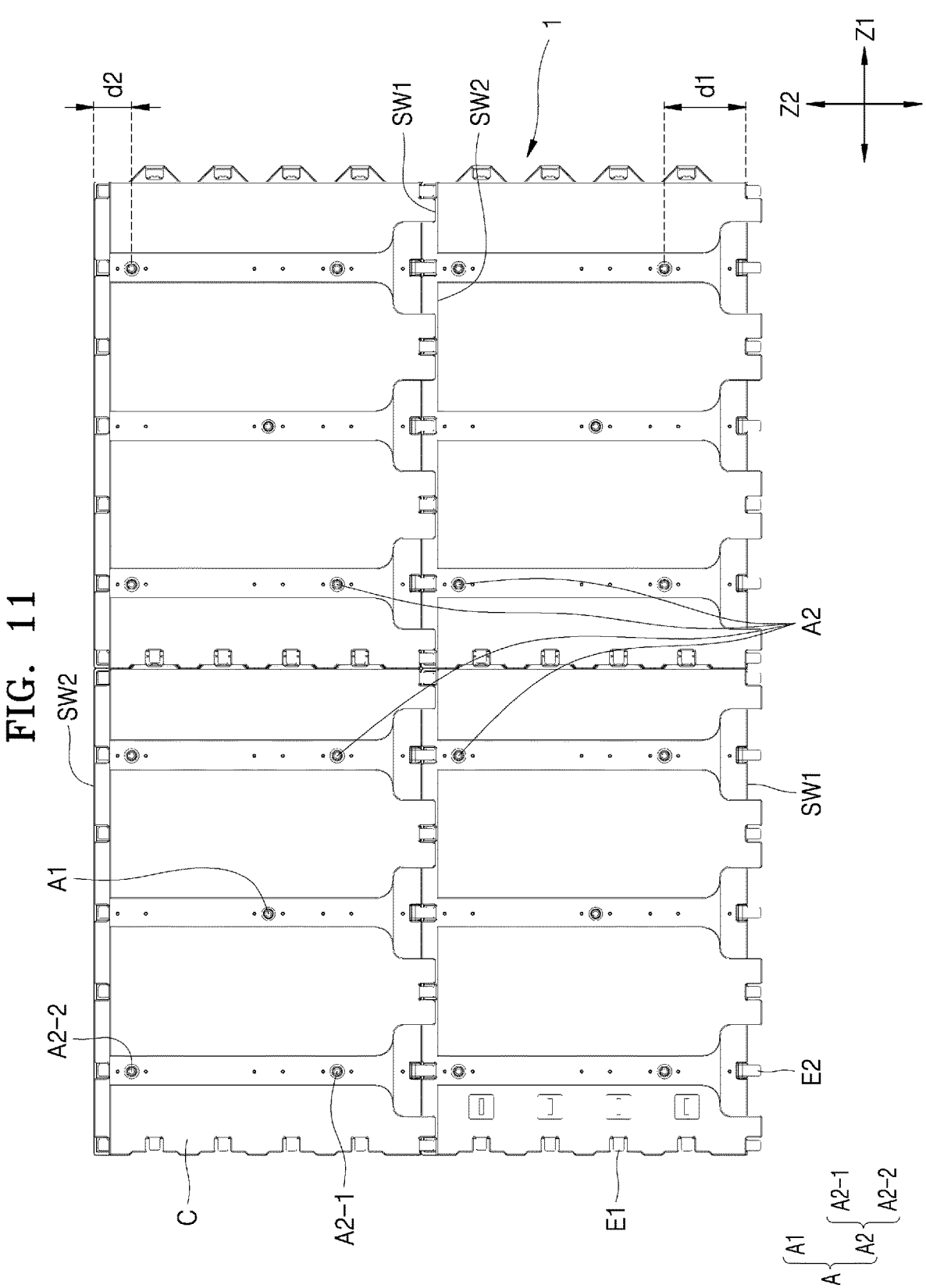
FIG. 11 is a plan view for describing an arrangement of a thermistor in a module in which battery packs according to the present disclosure are expanded in a column direction and a row direction.

FIG. 7 is an exploded perspective view of a battery pack according to an embodiment of the present disclosure, provided to describe an assembly of a thermistor. FIG. 8 is an enlarged perspective view of a part of the upper holder of FIG. 7. FIG. 9 is a perspective view showing a state in which a cover of FIG. 7 is assembled on the upper holder of FIG. 8. FIG. 10 is a plan view for describing an arrangement of a thermistor in a module in which battery packs according to the present disclosure are expanded in a column direction. FIG. 11 is a plan view for describing an arrangement of a thermistor in a module in which battery packs according to the present disclosure are expanded in a column direction and a row direction.

An array structure of a thermistor TH for sensing a temperature of a battery cell 10 according to an embodiment of the present disclosure will be described with reference to FIGS. 7 to 11 below. In an embodiment of the present disclosure, a cell holder W may include a hollow protrusion H protruding along a height direction Z3 crossing a column direction Z1 and a row direction Z2, and a cover C on the cell holder W may be provided with an exposure hole C' to expose the hollow protrusion H. The thermistor TH for detecting a temperature of the battery cell 10 may be accommodated in the hollow protrusion H through the exposure hole C'.

The hollow protrusion H has an empty inner space to accommodate the thermistor TH and may protrude in the height direction Z3 so that the thermistor TH may be accommodated in the hollow protrusion H from the cell holder W in the height direction Z3. For example, the hollow protrusion H may include an annular side wall around (e.g., to surround) a central hollow portion accommodating the thermistor TH, and in various embodiments of the present disclosure, the hollow protrusion H may be formed in various suitable shapes around (e.g., surrounding) the central hollow portion accommodating the thermistor TH, as well as an annular shape.

The hollow protrusion H may accommodate the thermistor TH, for detection of a temperature of the battery cell 10, through the central hollow portion, and the position of the hollow protrusion H may correspond to the position of the thermistor TH accommodated in the hollow protrusion H or a temperature detection position A at which a temperature of the battery cell 10 is detected using the thermistor TH. Throughout the present specification, a position of the hollow protrusion H, a position of the thermistor TH, and the temperature detection position A may refer to substantially the same position, and may be understood to refer to a position of the hollow protrusion H on a plane formed by the column direction Z1 and the row direction Z2, a position of the thermistor TH in the hollow protrusion H, or a temperature detection position A of the battery cell 10 detected using the thermistor TH. The temperature detection position A on a plane of the cell holder W will be described in more detail below. Through the present specification, the plane of the cell holder W may refer to a plane of the cell holder W, which is formed by the column direction Z1 and the row direction Z2, and the temperature detection position A may be defined on the plane of the cell holder W.

In an embodiment of the present disclosure, the temperature detection position A may include a first temperature detection position A1 corresponding to a central position of the plane of the cell holder W and a second temperature detection position A2 adjacent to a corner position rather than the central position. In an embodiment of the present disclosure, the second temperature detection position A2 may be a position located adjacent to the corner position and separated from a front wall FW, a rear wall RW, or the first and second side walls SW1 and SW2 forming the corner position. For example, the cell holder W may include four corner positions formed while one of the front or rear wall FW or RW extending in the row direction Z2 and one of the first or second side wall SW1 or SW2 extending in the column direction Z1 contact each other and, the second temperature detection position A2 may include a total of four second temperature detection positions A2 adjacent to the four corners.

In an embodiment of the present disclosure, the central position may be comprehensively defined to include a center and positions adjacent to the center on the plane of the cell holder W in the column direction Z1 and the row direction Z2. The cell holder W may include the front and rear walls FW and RW opposite to each other in the column direction Z1 and the first and second side walls SW1 and SW2 opposite to each other in the row direction Z2, and the corner positions may be comprehensively defined to include corners formed as the front and rear walls FW and RW. The first and second side walls SW1 and SW2 extending in different directions may be in contact with one another and in positions adjacent to the corners.

In an embodiment of the present disclosure, a temperature of a battery cell 10 at the central position on the cell holder W may be detected from the first temperature detection position A1, and a temperature of a battery cell 10 adjacent to a corner position on the cell holder W may be detected from the second temperature detection position A2. In an embodiment of the present disclosure, the temperature detection position A may include a total of five temperature detection positions A, including one first temperature detection position A1 corresponding to the central position and four second temperature detection positions A2 corresponding to the four corner positions. In an embodiment of the present disclosure, temperature information at the central position and the four corner positions on the cell holder W (e.g., four positions adjacent to the corner positions) may be detected from a total of five positions from among the first and second temperature detection positions A1 and A2, and an entire temperature distribution on the plane of the cell holder W may be determined from the first and second temperature detection positions A1 and A2. As described below, a central position on a module 100 expanded to include a battery pack 1 or multiple battery packs 1 is farther away from the outside of the battery pack 1 or the module 100 than corner positions on the module 100 and thus may be a relatively high temperature region. Therefore, in an embodiment, it may be desirable to include a central position as part of the temperature detection position A to monitor the central position which is a relatively high temperature region. In an embodiment of the present disclosure, the first temperature detection position A1 may correspond to the central position on the module 100 expanded to include the battery pack 1 or the multiple battery packs 1. For example, the first temperature detection position A1 may correspond to a central position on the battery pack 1, and may correspond to a central position on a module 100, which is expanded in the column direction Z1, in the row direction Z2 as shown in FIG. 10. As described above, the first temperature detection position A1 may correspond to a central position on a module 100 expanded to include a battery pack 1 and multiple battery packs 1 in the column direction Z1, and thus, when the module 100 is expanded in the column direction Z1 by arranging multiple battery packs 1 each including the first temperature detection position A1 in each central position, the central position on the module 100 may be monitored using the first temperature detection position A1 of the battery pack 1 without additionally selecting a temperature detection position A.

The second temperature detection position A2 may be adjacent to the four corners, may be adjacent to a corner position on a battery pack 1 rather than a central position, and may correspond to the central position on the module 100 expanded in the column direction Z1 and the row direction Z2 as shown in FIG. 11. For example, in a module 100 expanded in the column direction Z1 and the row direction Z2, e.g., a module 100 with a total of four battery packs 1, including two neighboring battery packs 1 in the column direction Z1 and two neighboring battery packs 1 in the row direction Z2, second temperature detection positions A2 on the battery packs 1 may be adjacent to a central position on the expanded module 100. Because four second temperature detection positions A2 on each of the battery packs 1 are adjacent to the central position on the module 100 as described above, in the module 100 expanded in the column direction Z1 and the row direction Z2, temperature information about the central position on the module 100 may be obtained using the second temperature detection positions A2 on each of the battery packs 1 adjacent to the central position on the module 100 without selecting an additional temperature detection position A to monitor the central position on the module 100.

In the module 100 expanded in the column direction Z1 and the row direction Z2, a second temperature detection position A2 adjacent to a corner position on a battery pack 1 among the second temperature detection positions A2 adjacent to the central position on the module 100 may be located adjacent to the central position on the module 100 according to a position of each battery pack 1 in the module 100 expanded to include multiple battery packs 1. For example, when a battery pack 1 having the same structure is set to one unit and multiple battery packs 1 are arranged to face each other in the column direction Z1 and the row direction Z2, a certain second temperature detection position A2 among second temperature detection positions A2 on each of the battery packs 1 may be located adjacent to the central position on the expanded module 100 according to an orientation of each of the battery packs 1.

In an embodiment of the present disclosure, a first extension side FW (e.g., a front wall) and a first reception side RW (e.g., a rear wall) may face each other in the column direction Z1, and in an embodiment of the present disclosure, the first extension side FW (e.g., the front wall) may correspond to the front wall FW and the first reception side RW (e.g., the rear wall) may correspond to the rear wall RW. In an embodiment of the present disclosure, a second extension side SW1 (e.g., a first side wall) and a second reception side SW2 (e.g., a second side wall) may be provided to each other in the row direction Z2, and in an embodiment of the present disclosure, the second extension side SW1 (e.g., the first side wall) may correspond to the first side wall SW1 and the second reception side SW2 (e.g., the second side wall) may correspond to the second side wall SW2. As described above, in an embodiment of the present disclosure, in a module 100 expanded in the column direction Z1 and the row direction Z2, a first extension side FW (e.g., a front wall) and a first reception side RW (e.g., a rear wall) face each other in the column direction Z1 and the second extension side SW1 (e.g., the first side wall) and the second reception side SW2 (e.g., the second side wall) face each other in the row direction Z2.

Referring to FIG. 7, in an embodiment of the present disclosure, second temperature detection positions A2 on battery cells 10 may be asymmetrical positions between the second extension side SW1 (e.g., the first side wall) and the second reception side SW2 (e.g., the second side wall) facing each other in the row direction Z2, and in an embodiment of the present disclosure, four second temperature detection positions A2 may be biased more toward the second reception side SW2 (e.g., the second side wall) among the second extension side SW1 (e.g., the first side wall) and the second reception side SW2 (e.g., the second side wall). In an embodiment of the present disclosure, the second temperature detection positions A2 may be provided between the second extension side SW1 (e.g., the first side wall) and the second reception side SW2 (e.g., the second side wall) to be asymmetrical with one another and be biased toward one of the second extension side SW1 (e.g., the first side wall) and the second reception side SW2 (e.g., the second side wall), e.g., the second reception side SW2 (e.g., the second side wall), thereby monitoring a temperature distribution of the battery pack 1 more accurately. In an embodiment of the present disclosure, because the second temperature detection positions A2 are asymmetrical positions, a temperature distribution of the entire battery pack 1 may be monitored more accurately even with a limited number of temperature detection positions A, and for example, four second temperature detection positions A2, which are asymmetrical positions, may be expanded to be symmetrical with one another on a plane of the cell holder W and thus a temperature distribution may be calculated or estimated with respect to eight positions.

More specifically, in an embodiment of the present disclosure, the second temperature detection positions A2 may be provided between the second extension side SW1 (e.g., the first side wall) and the second reception side SW2 (e.g., the second side wall) to be biased toward the second reception side SW2 (e.g., the second side wall). For example, the second temperature detection positions A2 may include a first second temperature detection position A2-1 adjacent to the second extension side SW1 (e.g., the first side wall), and a second second temperature detection position A2-2 adjacent to the second reception side SW2 (e.g., the second side wall). In this case, a first distance d1 between the second extension side SW1 (e.g., the first side wall) and the first second temperature detection position A2-1 may be set to be longer than a second distance d2 between the second reception side SW2 (e.g., the second side wall) and the second second temperature detection position A2-2. In an embodiment of the present disclosure, the first second temperature detection position A2-1 may include two first second temperature detection positions A2-1 provided along the second extension side SW1 (e.g., the first side wall) to be spaced from each other in the column direction Z1, and the second second temperature detection position A2-2 may include two second second temperature detection positions A2-2 along the second reception side SW2 (e.g., the second side wall) to be spaced from each other in the column direction Z1.

Referring to FIG. 11, in an embodiment of the present disclosure, second temperature detection positions A2 that are asymmetrical positions on battery packs 1 may be asymmetrical with each other in a module 100 expanded in the column direction Z1 and the row direction Z2. For example, in the expanded module 100, the second temperature detection positions A2 may be asymmetrical positions between the second extension side SW1 (e.g., the first side wall) and the second reception side SW2 (e.g., the second side wall). For example, in a module 100 with four battery packs 1 each including four second temperature detection positions A2, a total of sixteen second temperature detection positions A2 may be biased toward the second reception side SW2 (e.g., the second side wall) between the second extension side SW1 (e.g., the first side wall) and the second reception side SW2 (e.g., the second side wall) forming outer sides of the module 100 in the row direction Z2. Here, when in the module 100 with the four battery packs 1, the total of sixteen second temperature detection positions A2 are biased toward the second reception side SW2 (e.g., the second side wall) between the second extension side SW1 (e.g., the first side wall) and the second reception side SW2 (e.g., the second side wall) forming outer sides of the module 100 in the row direction Z2, it may be understood to refer to a total of sixteen second temperature detection positions A2 being biased toward the second reception side SW2 (e.g., the second side wall) with respect to central positions on the battery packs 1 among the second reception side SW2 (e.g., the second side wall) and the second extension side SW1 (e.g., the first side wall) forming the outer sides of the module 100.

In an embodiment of the present disclosure, a temperature distribution at a central position on the expanded module 100 or a position adjacent to the central position may be more accurately obtained from the second temperature detection positions A2 that are asymmetrical positions on the battery packs 1. For example, in an embodiment of the present disclosure, the second temperature detection positions A2 on the battery packs 1 are asymmetrical positions and thus a temperature may be prevented from being substantially redundantly detected when a total of four second temperature detection positions A2 on different battery packs 1 in the expanded module 100 are extremely adjacent to the central position on the module 100 and may be prevented from not being detected at the central position when a total of four second temperature detection positions A2 are extremely far away from the central position. For example, in an embodiment of the present disclosure, when a module 100 is expanded such that a second extension side SW1 (e.g., a first side wall) and a second reception side SW2 (e.g., a second side wall) of neighboring battery packs 1 in the row direction Z2 face each other, a temperature may be detected at a second temperature detection position A2 on one of the battery packs 1, which includes the second reception side SW2 (e.g., the second side wall) facing the second extension side SW1 (e.g., the first side wall) of the other battery pack 1, closer to the central position on the module 100, and may be detected even at a second temperature detection position A2 on the battery pack 1, which includes the second extension side SW1 (e.g., the first side wall) facing the second reception side SW2 (e.g., the second side wall) of the other battery pack 1, which is farther from the central position on the module 100.

In an embodiment of the present disclosure, the second temperature detection positions A2 may be biased more toward the second reception side SW2 (e.g., the second side wall) than the second extension side SW1 (e.g., the first side wall), but in various embodiments of the present disclosure, the second temperature detection positions A2 may be biased more toward the second extension side SW1 (e.g., the first side wall) than the second reception side SW2 (e.g., the second side wall) or may be at asymmetrical positions between the first extension side FW (e.g., the front wall) and the first reception side RW (e.g., the rear wall) facing each other in the column direction Z1 rather than at asymmetrical positions between the second extension side SW1 (e.g., the first side wall) and the second reception side SW2 (e.g., the second side wall) facing each other in the row direction Z2. In various embodiments of the present disclosure, the second temperature detection positions A2 may be at symmetrical positions on a plane of the cell holder W, and may be, for example, at symmetrical positions between the second extension side SW1 (e.g., the first side wall) and the second reception side SW2 (e.g., the second side wall) facing each other in the row direction Z2 or at symmetrical positions between the first extension side FW (e.g., the front wall) and the first reception side RW (e.g., the rear wall) facing each other in the column direction Z1.

Referring to FIGS. 7 to 9, in an embodiment of the present disclosure, a thermistor TH may be provided at the temperature detection position A to measure a temperature of the battery cell 10. More specifically, the thermistor TH may be accommodated in a hollow projection H on a cell holder W and may be accommodated in a hollow portion surrounded by the hollow projection H. The hollow projection H may protrude from a main body of the cell holder W in the height direction Z3, and the main body of the cell holder W may be provided with the hollow projection H and a guide piece G. The guide piece G may protrude from the main body of the cell holder W in the height direction Z3 to fix a position of a bus bar B and regulate an assembly position of the bus bar B to be assembled on the cell holder W. The position of the bus bar B may be regulated and prevented or substantially prevented from being moved on the plane of the cell holder W as outlines of the guide piece G of the cell holder W and the bus bar B physically interfere with each other. In an embodiment of the present disclosure, similar to the guide piece G, the hollow projection H protruding from the main body of the cell holder W in the height direction Z3 may regulate an assembly position of the bus bar B arranged on the cell holder W, and for example, the hollow protrusion H on the cell holder W may be inserted into an assembly hole in the bus bar B to more firmly maintain a normal position of the bus bar B. The hollow protrusion H and the guide piece G physically interfere with a main body B1 of the bus bar B and thus may be provided at a position at which the main body B1 of the bus bar B is arranged. In an embodiment of the present disclosure, the main body B1 of the bus bar B may be arranged between a group of neighboring battery cells 10g in the column direction Z1 and thus the hollow protrusion H and the guide piece G may be provided at a position between a group of neighboring battery cells 10g on the plane of the cell holder W.

In an embodiment of the present disclosure, the position of the hollow protrusion H corresponds to a temperature detection position A at which the thermistor TH is placed and thus the temperature detection position A may be located between a group of battery cells 10g in the column direction Z1, and for example, between every two neighboring battery cells 10, i.e., between a total of four neighboring battery cells 10. The hollow protrusion H is provided at a temperature detection position A between neighboring battery cells 10 and thus the thermistor TH accommodated in the hollow protrusion H may be considered as being configured to measure a temperature between the neighboring battery cell 10 rather than a temperature of a certain battery cell 10.

A battery pack 1 according to an embodiment of the present disclosure may be manufactured as described below. For example, a bus bar B and a connection member 50 (see FIG. 16) are disposed on a cell holder W assembled with a battery cell 10, and a potting resin may be applied on the cell holder W on which the bus bar B and the connection member 50 are disposed. In this case, the potting resin may protect the connection member 50 on the cell holder W and protect a bonding portion of the connection member 50 on the bus bar B and the battery cell 10 connected through the connection member 50. In this case, the potting resin is applied on the cell holder W on which the bus bar B and the connection member 50 are disposed, and the inside of the hollow protrusion H protruding from the main body of the cell holder W in the height direction Z3, i.e., the hollow protrusion surrounded by the hollow protrusion H, may not be filled with the potting resin. For example, the hollow protrusion H may surround the hollow portion on which the thermistor H is located from the potting resin applied on the cell holder W to protect the hollow portion assembled with the thermistor TH, and exclude the potting resin from the hollow portion to prevent or substantially prevent interference with the assembly of the thermistor TH inserted into the hollow portion.

As described above, a cover C may be disposed on the cell holder W on which the potting resin is applied, the hollow protrusion H on the cell holder W may be exposed via an exposure hole C' in the cover C, and the thermistor TH may be accommodated in the hollow protrusion H exposed outside the cover C. For example, in the manufacture of the battery pack 1 according to an embodiment of the present disclosure, the thermistor TH may be assembled in a final stage and thus the assembly thereof need not be considered in an intermediate stage of the manufacture of the battery pack 1, and in the final stage, the thermistor TH may be simply assembled with the hollow protrusion H exposed on the cover C, thereby simplifying the manufacture of the battery pack 1 and increasing convenience of the manufacture of the battery pack 1.

Referring to FIG. 9, a height of the hollow protrusion H may be set to be substantially the same as or less than a height formed by an outer surface of the cover C. When the hollow protrusion H protrudes from the outer surface of the cover C, the hollow protrusion H protruding from the outer surface of the battery pack 1 may not be protected from external impacts and thus the cover C may not function substantially normally (e.g., function as intended).

Referring to FIGS. 1 to 3, in an embodiment of the present disclosure, an upper end of the battery cell 10 may be assembled on an upper holder W1 and a lower end of the battery cell 10 may be assembled on a lower holder W2 in the height direction Z3, and in this case, the upper end of the battery cell 10 and the upper holder W1 may be fixed together by an adhesive and the lower end of the battery cell 10 and the lower holder W2 may be fixed together by an interference fit. In an embodiment of the present disclosure, the upper end of the battery cell 10 (electrodes 11 and 12 on the upper end of the battery cell 10) and the bus bar B may be connected (e.g., electrically connected) through the connection member 50 (see FIG. 16) and the connection member 50 may be a flexible member such as a conductive wire or a conductive ribbon, and thus, the upper end of the battery cell 10 and the upper holder W1 may be fixed together by an adhesive to suppress or reduce rotation of the upper portion or the upper end of the battery cell 10, thereby preventing or substantially preventing damage to the connection member 50 connected between the upper end of the battery cell 10 and the bus bar B. For example, one end of the connection member 50 connecting the upper end of the battery cell 10 (e.g., the electrodes 11 and 12 on the upper end of the battery cell 10) and the bus bar B may be bonded on the upper end of the battery cell 10 (e.g., the electrodes 11 and 12 on the upper end of the battery cell 10) and another end thereof may be bonded on the bus bar B to electrically connect the upper end of the battery cell 10 and the bus bar B through the one end of the connection member 50 connected to the battery cell 10 and the other end of the connection member 50 connected to the bus bar B. In an embodiment of the present disclosure, the connection member 50 may be provided as a conductive wire or a conductive ribbon and bonded by wire bonding or ribbon bonding.

In an embodiment of the present disclosure, the upper and lower ends of the battery cell 10 may be assembled while being exposed in the height direction Z3 to the outside from the upper holder W1 and the lower holder W2, and for example, the electrodes 11 and 12 on the upper end of the battery cell 10 and the bus bar B may be connected (e.g., electrically connected) while the upper end of the battery cell 10 is exposed from the upper holder W1 and the battery cell 10 may be cooled through the lower end of the battery cell 10 while the lower end of the battery cell 10 is exposed from the lower holder W2. For example, the upper end of the battery cell 10 exposed from the upper holder W1 may be electrically connected to the bus bar B and the lower end thereof exposed from the lower holder W2 may be in thermal contact with a cooling plate 70 (see FIG. 1). Throughout the present specification, inserting the upper end of the battery cell 10 into the upper holder W1 and the lower end thereof into the lower holder W2 in the height direction Z3 may be understood to refer to, for example, an upper portion of the battery cell 10 adjacent to the upper end of the battery cell 10 and a lower portion of the battery cell 10 adjacent to the lower end of the battery cell 10 physically interfering with the upper holder W1 and the lower holder W2, respectively, thereby fixing the upper and lower ends of the battery cell 10 in position. For example, the upper portion of the battery cell 10 may be understood to refer to a position between the upper end of the battery cell 10 and a midpoint on the battery cell 10 in the height direction Z3 and the lower portion of the battery cell 10 may be understood to refer to a position between the lower end of the battery cell 10 and the midpoint on the battery cell 10 in the height direction Z3.

In an embodiment of the present disclosure, the battery cell 10 and the cell holder W may be assembled together as described below. First, after applying an adhesive on the upper end of the battery cell 10, the upper end of the battery cell 10 may be fitted and assembled with the upper holder W1 in a state in which the upper holder W1 is turned upside down. Here, the fitting and assembling of the upper end of the battery cell 10 with the upper holder W1 in the state in which the upper holder W1 is turned upside down may be understood to refer to assembling the battery cell 10 toward an upper surface of the upper holder W1 from a lower surface of the upper holder W1, and the upper and lower surfaces of the upper holder W1 are surfaces opposite to each other and may refer to a surface of the upper holder W1 opposite to the cover C and a surface thereof facing the cover C. In this case, the upper end of the battery cell 10 and the upper holder W1 may be fixed together by the adhesive by fitting and assembling the upper end of the battery cell 10 on which the adhesive is applied with the upper holder W1 in the state in which the adhesive is applied on the upper end of the battery cell 10.

Next, the lower holder W2 may be assembled toward the battery cell 10 fitted to the upper holder W1. For example, the lower holder W2 may be interference fitted with the lower portion of the battery cell 10 to fix the position of the lower portion of the battery cell 10. In an embodiment of the present disclosure, the lower holder W2 may be assembled in a direction from the lower end of the battery cell 10 toward the upper end of the battery cell 10, and throughout the present specification, the assembling of the battery cell 10 toward the lower holder W2 may be understood to include assembling the lower holder W2 toward the battery cell 10 because an assembly direction of one of the lower holder W2 and the battery cell 10 is a direction opposite the other. In an embodiment of the present disclosure, an assembly between the cell holder W and the battery cell 10 may be performed while the cell holder W and the battery cell 10 are turned upside down, and for example, the battery cell 10 on which the adhesive is applied may be fitted and assembled with the upper holder W1 of the cell holder W while the upper holder W1 is turned upside down and the lower holder W2 may be fitted and assembled with the lower end of the battery cell 10 while the upper holder W1 and the battery cell 10 fitted into the upper holder W1 are turned upside down. Throughout the present specification, the performing of the assembly between the cell holder W and the battery cell 10 while the cell holder W and the battery cell 10 are turned upside down may be understood to refer to performing the assembly between the cell holder W and the battery cell 10 while the cell holder W and the battery cell 10 are turned upside down in the height direction Z3 when an orientation of the battery pack is as shown in FIG. 1, for example, performing the assembly between the cell holder W and the battery cell 10 while the cell holder W and the battery cell 10 are turned upside down such that the bus bar B on the battery pack 1, the upper holder W1 supporting the bus bar B or the upper end of the battery cell 10 connected (e.g., electrically connected) to the bus bar B may be located at a relatively low position.

Referring to FIGS. 1 to 3, in an embodiment of the present disclosure, the cell holder W may be assembled with multiple battery cells 10 and include the upper holder W1 and the lower holder W2 on an upper position and a lower position in the height direction Z3. Throughout the present specification, arranging the upper holder W1 and the lower holder W2 on an upper position and a lower position on the battery cell 10, respectively, may be understood to refer to arranging the upper holder W1 and the lower holder W2 at different levels on the battery cell 10 in the height direction Z3, and the upper position and the lower position on the battery cell 10 may refer to different levels on the battery cell 10 in the height direction Z3 and may be understood to refer to, for example, a position on the battery cell 10 closer to the bus bar B in the height direction Z3 and a position on the battery cell 10 farther from the bus bar B in the height direction Z3. Here, the height direction Z3 or the height direction Z3 of the battery cell 10 may refer to a direction crossing the column direction Z1 and the row direction Z2, and in an embodiment of the present disclosure, the height direction Z3 may refer to a direction perpendicular to the column direction Z1 and the row direction Z2. For example, the height direction Z3 may correspond to a longitudinal direction of the battery cell 10 or a direction in which the upper holder W1 and the lower holder W2 are assembled together while facing each other.

Throughout the present specification, a main body of the cell holder W may refer to a main body of the upper holder W1 or a main body of the lower holder W2, and the main body of the upper holder W1 or the main body of the lower holder W2 may include a main surface W1$m$ of the upper holder W1 or a main surface W2$m$ of the lower holder W2. For example, throughout the present specification, when a guide piece G and a hollow protrusion H protrude from the main body of the cell holder W in the height direction Z3, it may be understood to refer to the guide piece G and the hollow protrusion H protruding from the main body of the upper holder W1 in the height direction Z3, and for example, the guide piece G and the hollow protrusion H protruding from the main body of upper holder W1, i.e., the main surface W1$m$ of the upper holder W1 on which the bus bar B is placed, in the height direction Z3. Similarly, throughout the present specification, when a protrusion P protrudes from the main body of the cell holder W in the height direction Z3, it may be understood to refer to the protrusion P protruding from the main body of the lower holder W2 in the height direction Z3, and for example, the protrusion P protruding in the height direction Z3 from the main body of the lower holder W2, i.e., the main surface W2$m$ of the lower holder W2 on which a rim portion L around (e.g., surrounding) an outer circumference of the battery cell 10 is formed. The lower holder W2 with the protrusion P and the rim portion L will be described in more detail below.

The upper holder W1 may be provided with the guide piece G for alignment of a position of the bus bar B and the hollow protrusion H for accommodation of the thermistor TH, and the guide piece G and the hollow protrusion H may protrude from the main body of the cell holder W, i.e., the main body of the upper holder W1, in the height direction Z3. In an embodiment, the lower holder W2 coupled with the upper holder W1 to face the upper holder W1 in the height direction Z3 may be provided with a rim portion L around (e.g., surrounding) the outer circumference of the battery cell 10 and a protrusion P protruding from the rim portion L in the height direction Z3.

Figure 12:
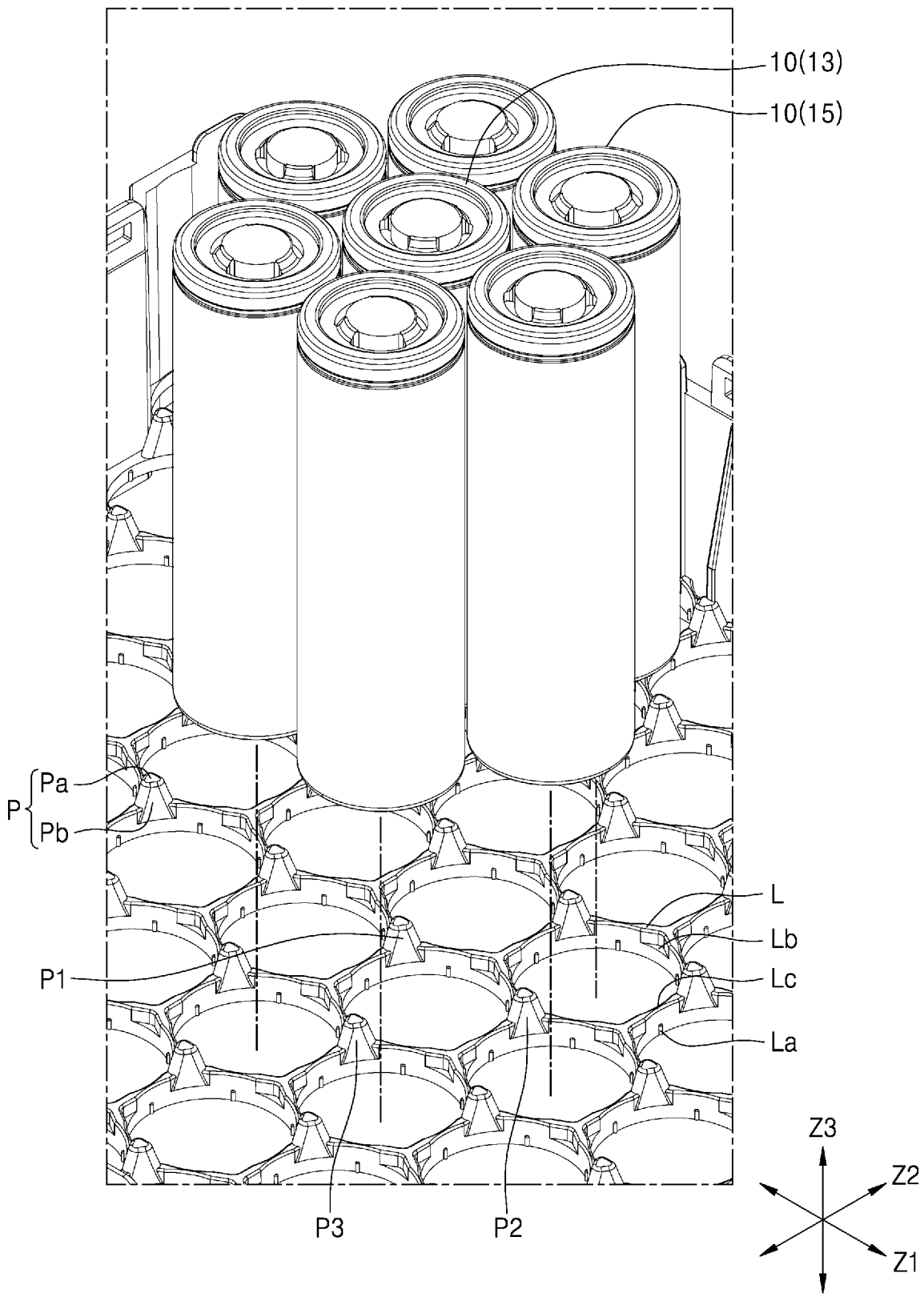
FIG. 12 is a perspective view for describing an assembly of a battery cell and a lower holder.
Figure 13:
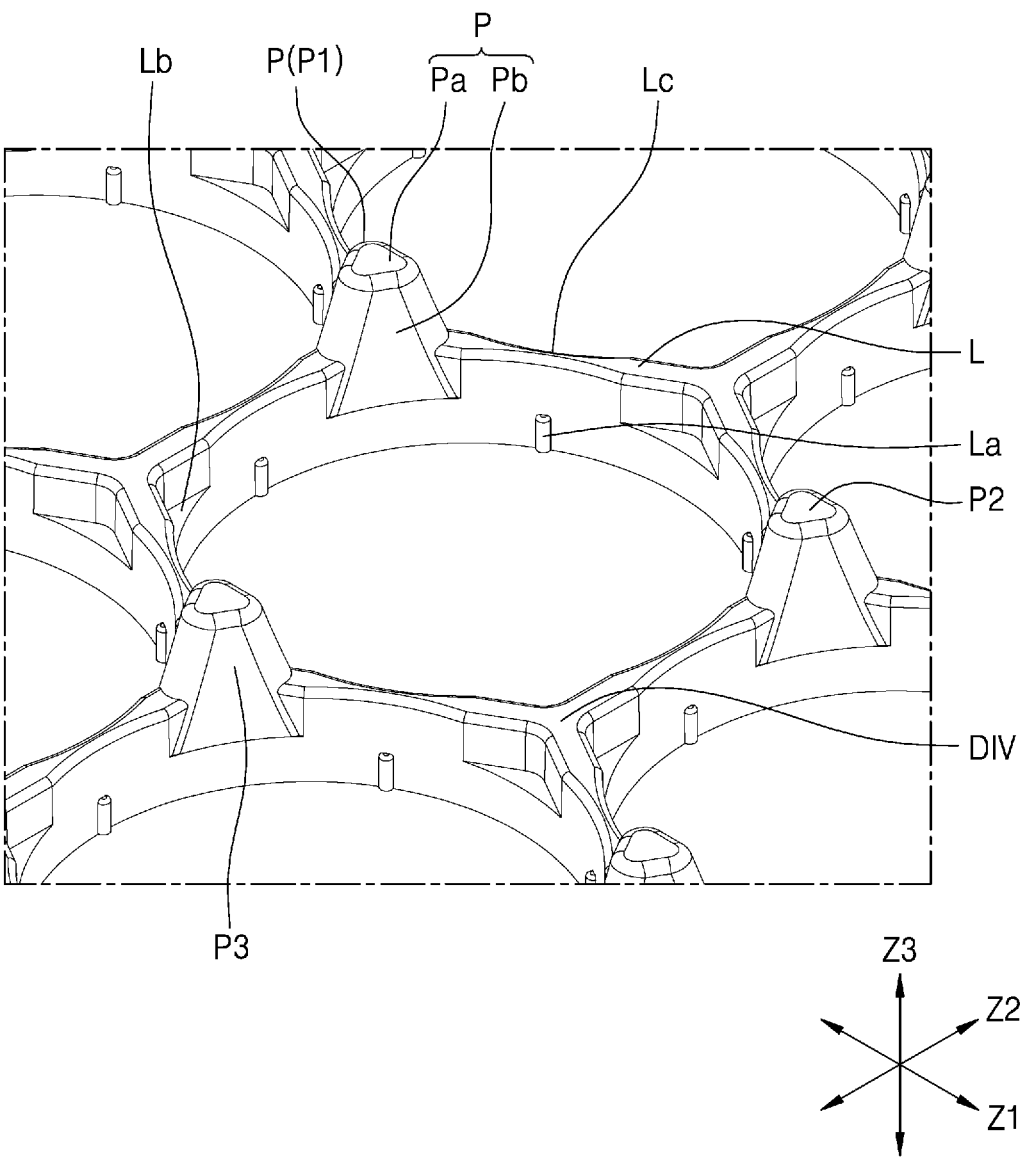
FIG. 13 is a perspective view of the lower holder of FIG. 12.
Figure 14:
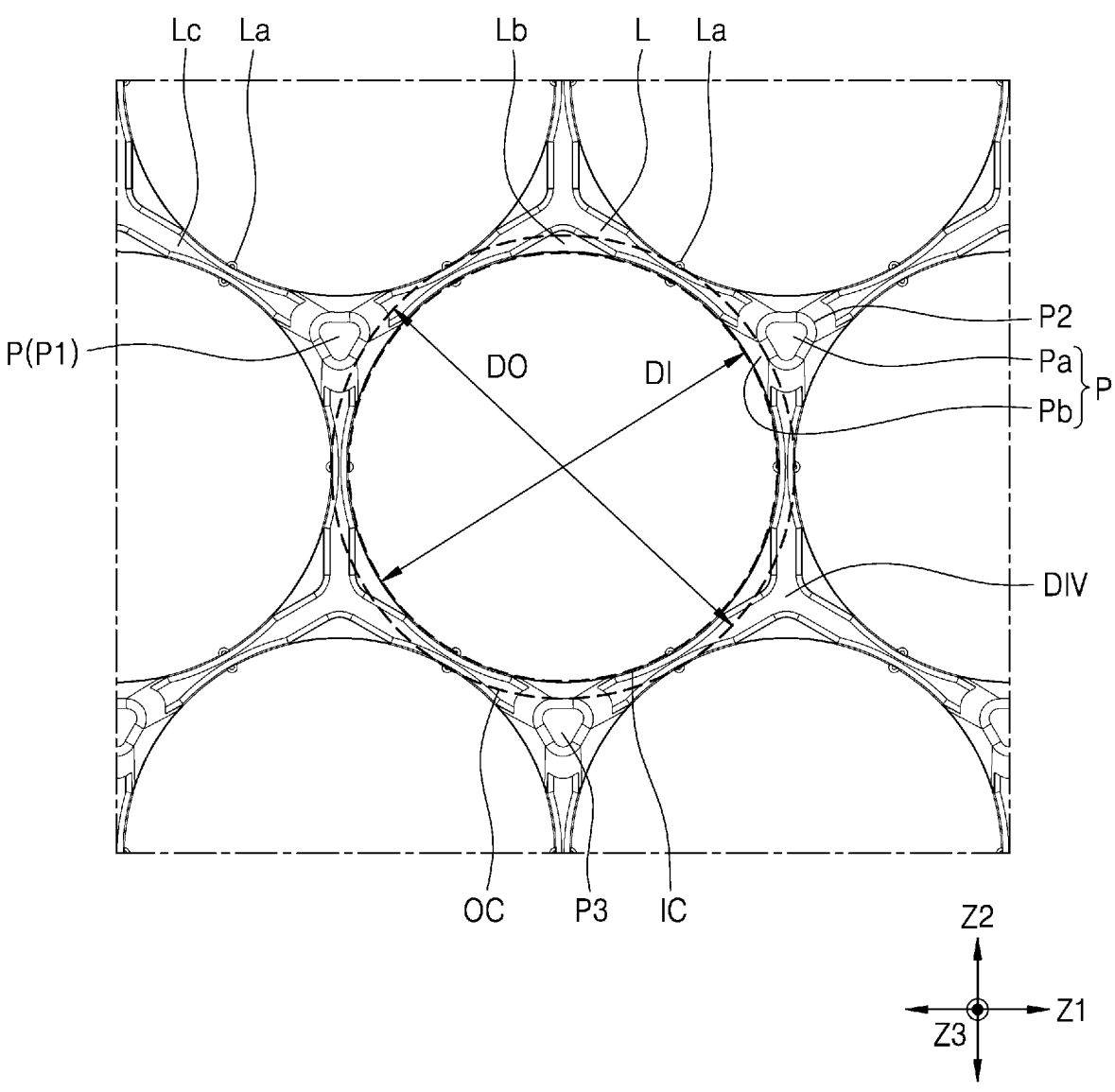
FIG. 14 is a plan view of the lower holder of FIG. 13.
Figure 15:
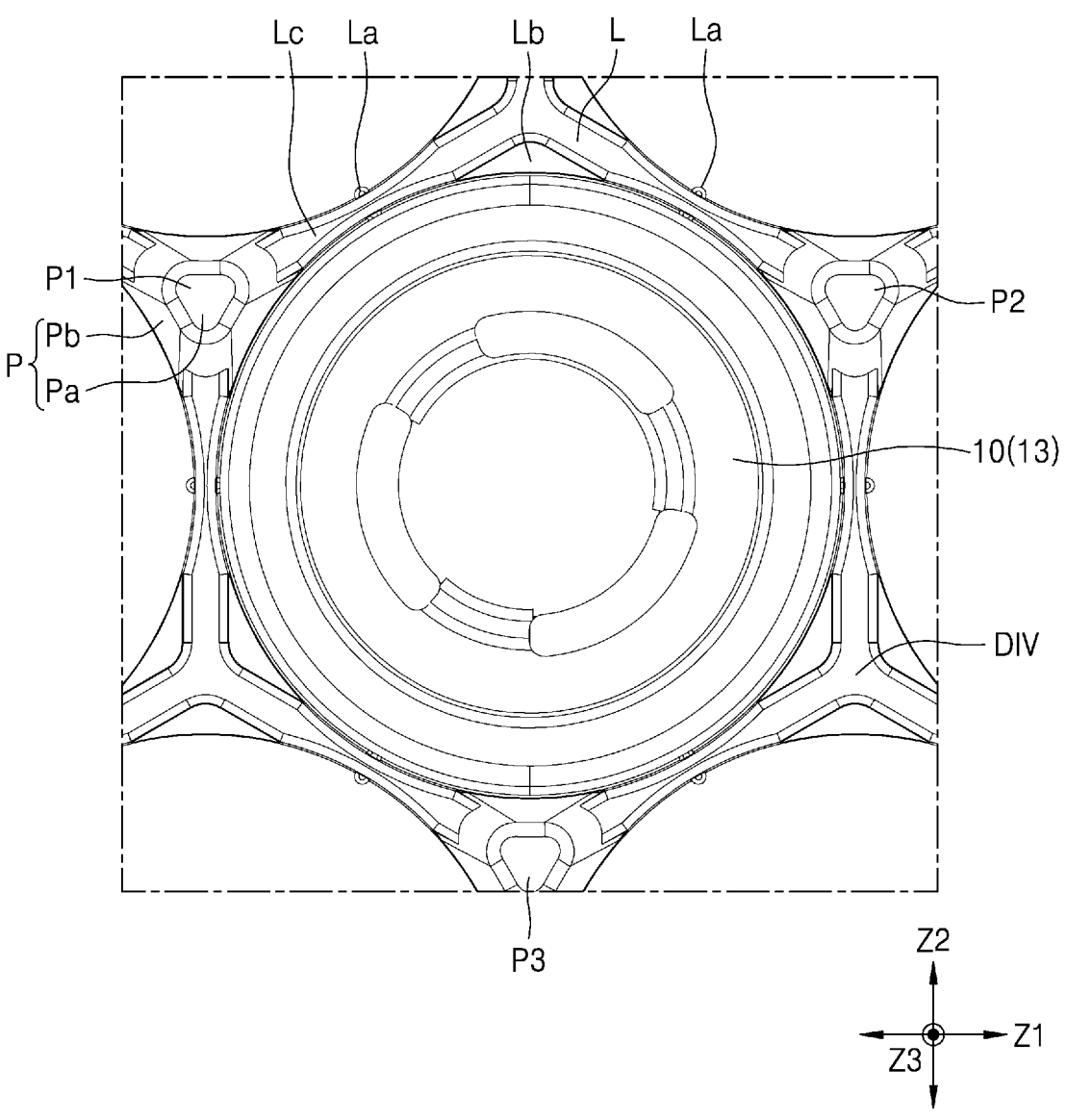
FIG. 15 is a plan view of a lower holder assembled with a battery cell.
Figure 16:
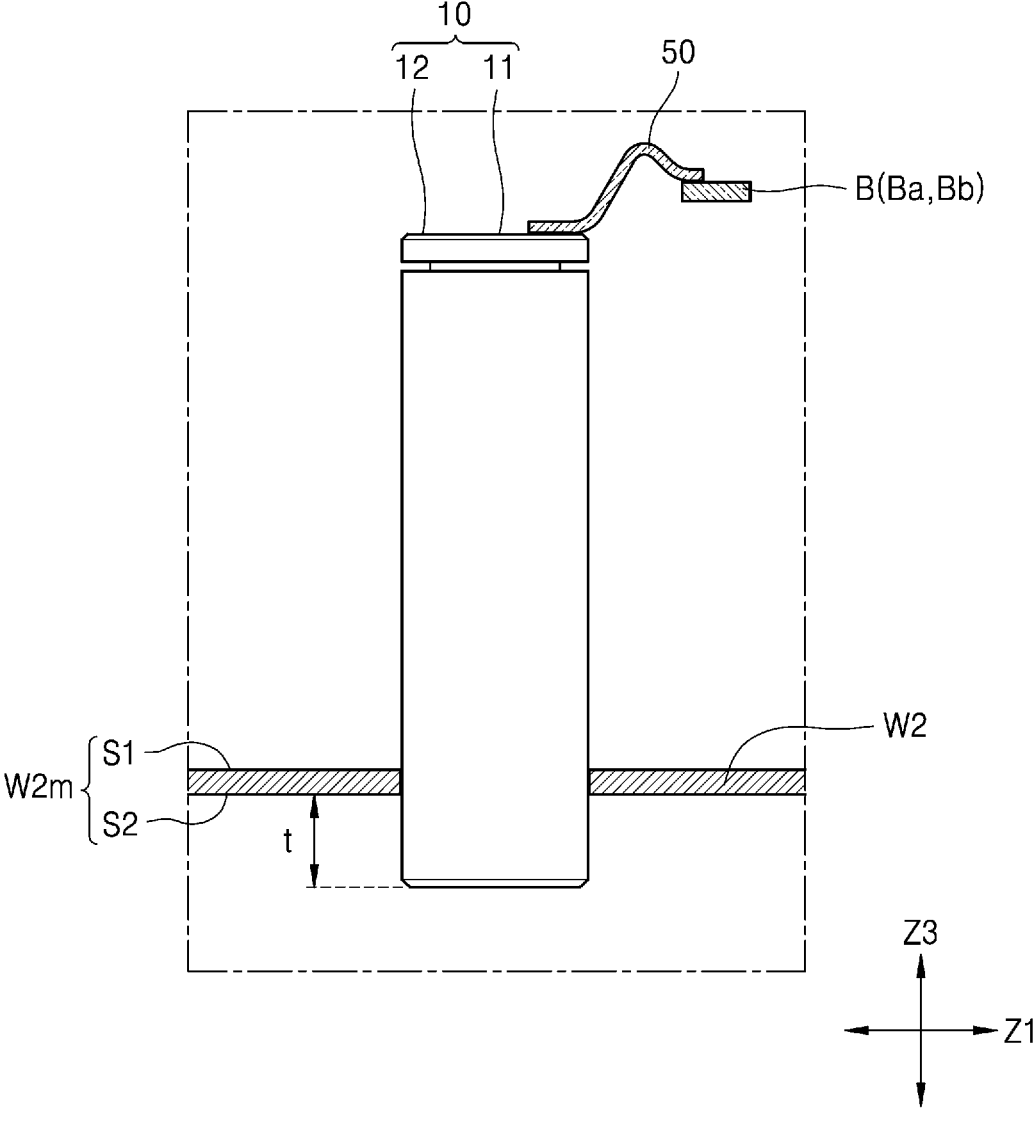
FIG. 16 is a side view of the lower holder of FIG. 15 assembled with the battery cell, when viewed in a column or row direction, which is provided to describe a depth of fixing the battery cell.

FIG. 12 is a perspective view for describing an assembly of a battery cell and a lower holder. FIG. 13 is a perspective view of the lower holder of FIG. 12. FIG. 14 is a plan view of the lower holder of FIG. 13. FIG. 15 is a plan view of a lower holder assembled with a battery cell. FIG. 16 is a side view of the lower holder of FIG. 15 assembled with the battery cell, when viewed in a column or row direction, which is provided to describe a depth of fixing the battery cell.

Referring to the drawings, the lower holder W2 is provided with a rim portion L around (e.g., surrounding) an outer circumference of the battery cell 10, and multiple protrusions P provided at different positions along the rim portion L and protruding from the rim portion L in the height direction Z3 opposite to an assembly direction of the battery cell 10. In an embodiment of the present disclosure, the protrusions P may include first to third protrusions P1, P2, and P3 provided at three different positions along the rim portion L around (e.g., surrounding) the outer circumference of one of the multiple battery cells 10, e.g., a first battery cell 13. For example, six others of the multiple battery cells 10, e.g., satellite battery cells 15, may be arranged along the outer circumference of the first battery cell 13, and the first battery cell 13 may be surrounded by the six satellite battery cells 15. In an embodiment of the present disclosure, battery cell 10 may be arranged in multiple columns in the column direction Z1 such that battery cells 10 in neighboring columns in the row direction Z2 crossing the column direction Z1 are biased at a forward position or a backward direction in the column direction Z1 and battery cells 10 in a column are inserted into valleys between battery cells 10 in a neighboring column, thereby achieving a dense array of the battery cells 10. In the dense array of the battery cells 10, six satellite battery cells 15 may be arranged along the outer circumference of a battery cell 10, e.g., the first battery cell 13, and the protrusion P may be provided between the first battery cell 13 and two satellite battery cells 15 neighboring each other along the outer circumference of the first battery cell 13, e.g., in valleys between the first battery cell 13 and the two satellite battery cells 15 neighboring each other along the outer circumference of the first battery cell 13. Throughout the present specification, when battery cells 10 are cylindrical battery cells 10, a valley may refer to a space between outer circumferential surfaces of neighboring cylindrical battery cells 10.

In an embodiment of the present disclosure, six satellite battery cells 15 may be arranged along the outer circumference of the first battery cell 13 and a total of six valleys may be provided between the first battery cell 13 and every two satellite battery cells 15 neighboring each other along the outer circumference of the first battery cell 13, and in an embodiment of the present disclosure, the protrusion P may not be provided in all of the total of six valleys along the outer circumference of the first battery cell 13 but may be provided at alternate positions on the outer circumference of the first battery cell 13 among the total of six valleys provided along the outer circumference of the first battery cell 13. A total of three protrusions P, i.e., the first to third protrusions P1, P2 and P3, may be provided along the outer circumference of the first battery cell 13. In an embodiment of the present disclosure, the protrusion P may include a protruding end portion Pa opposite to (e.g., at a different level from) the rim portion L in the height direction Z3 and a side surface Pb connecting the rim portion L and the protruding end portion Pa. In this case, the side surface Pb of the protrusion P may have a gradient along the assembly direction of the battery cell 10.

Referring to FIG. 14, in an embodiment of the present disclosure, the first to third protrusions P1, P2, and P3 may be formed along the outer circumference of the first battery cell 13, and in this case, side surfaces Pb thereof may form circular trajectories OC and IC around (e.g., surrounding) the first battery cell 13. For example, the side surfaces Pb of the first to third protrusions P1, P2, and P3 may face the outer circumference of the first battery cell 13 at different positions along the outer circumference of the first battery cell 13 and form the circular trajectories OC and IC around (e.g., surrounding) the first battery cell 13 to induce or facilitate the assembly of the first battery cell 13. In this case, the circular trajectories OC and IC formed by the side surfaces Pb of the first to third protrusions P1, P2, and P3 may have different diameters DO and DI in the height direction Z3. More specifically, the side surfaces Pb of the first to third protrusions P1, P2 and P3 may extend to the protruding end portions Pa thereof from the rim portion L forming a support base of the first to third protrusions P1, P2, and P3, and form the circular trajectories OC and IC respectively having the diameters DO and DI gradually reducing from the first circular trajectory OC formed by the side surfaces Pb of the first to third protrusions P1, P2 and P3 in contact with the protruding end portions Pa thereof to the second circular trajectory IC formed by the side surfaces Pb of the first to third protrusions P1, P2 and P3 in contact with the rim portion L. As described above, the side surfaces Pb of the first to third protrusions P1, P2, and P3 that induce the assembly of the first battery cell 13 form the circular trajectories OC and IC gradually reducing in the assembly direction of the first battery cell 13, and thus, the first battery cell 13 may be assembled at a normal position (e.g., a desired position) through interference between the outer circumferential surface of the first battery cell 13 and the side surfaces Pb of the first to third protrusions P1, P2 and P3 during the assembly of the first battery cell 13.

For example, the first to third protrusions P1, P2 and P3 may include a slanted side surface Pb with a gradient in the height direction Z3 and a slanted side surface Pb with a gentle gradient with no step. In this case, the side surfaces Pb of the first to third protrusions P1, P2 and P3 may form circular trajectories OC and IC with different diameters at different levels (e.g., heights) in the height direction Z3. Throughout the present specification, when the side surfaces Pb of the first to third protrusions P1, P2 and P3 form the circular trajectories OC and IC with different diameters DO and DI in the height direction Z3, it may be understood to refer to when circular trajectories OC and IC connect consecutively inner side surfaces Pb facing the outer circumferential surface of the first battery cell 13 among the side surfaces Pb of the first to third protrusions P1, P2 and P3, the circular trajectories OC and IC having different diameters DO and DI in the height direction Z3.

In an embodiment of the present disclosure, the diameter DO of the first circular trajectory OC formed by the side surfaces Pb of the first to third protrusions P1, P2 and P3 in contact with the protruding end portions Pa among the side surfaces Pb of the first to third protrusions P1, P2 and P3 may be a maximum diameter among the diameters DO and DI of the circular trajectories OC and IC formed by the side surfaces Pb of the first to third protrusions P1, P2 and P3 in the height direction Z3. The diameter DI of the second circular trajectory IC formed by the side surfaces Pb of the first to third protrusions P1, P2 and P3 in contact with the rim portion L among the side surfaces Pb of the first to third protrusions P1, P2 and P3 may be a minimum diameter among the diameters DO and DI of the circular trajectories OC and IC formed by the side surfaces Pb of the first to third protrusions P1, P2 and P3 in the height direction Z3.

In an embodiment of the present disclosure, the maximum diameter DO of the first circular trajectory OC and the minimum diameter DI of the second circular trajectory IC may be set to be greater than a diameter of the first battery cell 13. The circular trajectories OC and IC formed by the side surfaces Pb of the first to third protrusions P1, P2 and P3 may gradually reduce in the assembly direction of the first battery cell 13 to induce movement of the first battery cell 13 to the normal position (e.g., a desired position), and in this case, the second circular trajectory IC with the minimum diameter DI may corresponds substantially to the rim portion L forming the support base of the first to third protrusions P1, P2 and P3 and a contact protrusion La may be provided inside the rim portion L facing the outer circumferential surface of the first battery cell 13 for an interference fit with the first battery cell 13 as described below. For example, in an embodiment of the present disclosure, the first to third protrusions P1, P2 and P3 may be provided to merely induce movement of the first battery cell 13 to the normal position (e.g., the desired position) rather than form an interference fit with the first battery cell 13, and thus, the minimum diameter DI of the side surfaces Pb of the first to third protrusions P1, P2 and P3, i.e., the diameter DI of the second circular trajectory IC, may be set to be greater than the diameter of the first battery cell 13, and the first battery cell 13 induced to be moved to the normal position (e.g., the desired position) through the side surfaces Pb of the first to third protrusions P1, P2 and P3 may be fixed by being interference fitted with the contact protrusion La inside the rim portion L facing the outer circumferential surface of the first battery cell 13.

The first battery cell 13 may be assembled toward the rim portion L and thus be induced to be gradually moved to the normal position (e.g., the desired position) through the side surfaces Pb of the first to third protrusions P1, P2 and P3 around (e.g., surrounding) the first battery cell 13 and thus diameters DO and DI of the first and second circular trajectories OC and IC formed by the side surface Pb of the first to third protrusions P1, P2 and P3 may be set to be greater than the diameter of the first battery cell 13. For example, when the diameters DO and DI of the first and second circular trajectories OC and IC are equal to or less than the diameter of the first battery cell 13, the first battery cell 13 may be difficult to be fitted between the side surfaces Pb of the first to third protrusions P1, P2 and P3, and may be, for example, neither interference fitted with the contact protrusion La protruding from the rim portion L forming a common support base of the first to third protrusions P1, P2 and P3 toward the outer circumferential surface of the first battery cell 13 nor be assembled due to the contact protrusion La.

In an embodiment of the present disclosure, multiple protrusions P may be formed along the rim portion L around (e.g., surrounding) the first battery cell 13 and the side surfaces Pb thereof facing the outer circumference of the first battery cell 13 may form a trajectory that gradually changes in the height direction Z3. In an embodiment of the present disclosure, the side surfaces Pb of the first to third protrusions P1, P2 and P3 facing the outer circumference of the first battery cell 13 may form the circular trajectories OC and IC, but in various embodiments of the present disclosure, the side surfaces Pb of multiple protrusions P facing the outer circumference of the first battery cell 13 may form a trajectory different from the circular trajectories OC and IC. Throughout the present specification, that the side surfaces Pb of the multiple protrusions P facing the outer circumference of the first battery cell 13 form a trajectory that gradually changes in the height direction Z may be understood to refer to a trajectory followed by the side surfaces Pb of the multiple protrusions P on, for example, a plane perpendicular to the height direction Z3 gradually changing in the height direction Z3. For example, a first trajectory OC formed at a first level (e.g., a first height) by the side surfaces Pb of the multiple protrusions P in the height direction Z3 and a second trajectory IC formed at a second level (e.g., a second height) different from the first level (e.g., the first height) by the side surfaces Pb of the multiple protrusions P in the height direction Z3 may be different from each other. As described above, the side surfaces Pb of the multiple protrusions P may form a gradient in the height direction Z3 so that trajectories formed at different levels in the height direction Z3 may gradually change in the height direction Z3, thereby guiding the assembly of the first battery cell 13 to the normal position (e.g., the desired position).

A shape of the rim portion L forming a common support base of the first to third protrusions P1, P2 and P3 will be described with reference to FIGS. 12 to 15 below. In an embodiment of the present disclosure, rim portions L around (e.g., surrounding) multiple battery cells 10 may be connected to each other in a net, or mesh, form, thereby forming a main surface W2*m* (see FIG. 16) of the lower holder W2. In an embodiment of the present disclosure, rim portions L around (e.g., surrounding) neighboring battery cells 10 are connected in a net form in a valley between neighboring battery cells 10, and for example, rim portions L each around (e.g., surrounding) one of three neighboring battery cells 10 may be in contact with one another in valleys between the three neighboring battery cells 10 and branch from the valleys in three different directions. For example, in an embodiment of the present disclosure, there may be a divergence point DIV on or at (e.g., in) a valley between neighboring battery cells 10, at which rim portions L each around (e.g., surrounding) one of neighboring battery cells 10 diverge in different directions while in contact with each other, and for example, there may be divergence points DIV on or at (e.g., in) valleys between three neighboring battery cells 10, from which rim portions L each around (e.g., surrounding) one of three neighboring battery cells 10 diverge in three different directions. As described above, in an embodiment of the present disclosure, there may be divergence points DIV on or at (e.g., in) valleys between three neighboring battery cells 10, from which rim portions L each around (e.g., surrounding) the three neighboring battery cells 10 diverge in three different directions while in contact with one another, and the valley or the divergence point DIV may be provided at different positions in an outer circumferential direction of a battery cell 10. For example, six different valleys or divergence points DIV may be provided in an outer circumferential direction of one of multiple battery cells 10, e.g., the first battery cell 13. For example, six satellite battery cells 15 may be arranged in the outer circumferential direction of the first battery cell 13, and every two neighboring satellite battery cells 15 in the outer circumferential direction of the first battery cell 13 and the first battery cell 13 may be provided with valleys between outer circumferential surfaces thereof or divergence points DIV, and for example, a total of six valleys or divergence points DIV may be provided in the outer circumferential direction of the first battery cell 13. Throughout the present specification, a valley may refer to a space between outer circumferential surfaces of neighboring battery cells 10, and a divergence point DIV may refer to a point from which rim portions L each around (e.g., surrounding) one of neighboring battery cells 10 diverge in three different directions in contact with one another when the rim portions L are connected in a net form, and in an embodiment of the present disclosure, valleys and divergence points DIV refer to points between three neighboring battery cells 10 and thus may correspond to the same points. For example, the valley and the divergence point DIV may be provided at six different positions along rim portions L each around (e.g., surrounding) one of multiple battery cells 10. For example, the valley or the divergence point P may be provided at six different positions along a rim portion L around (e.g., surrounding) one of multiple battery cells 10, e.g., the first battery cell 13, and the first to third protrusions P1, P2 and P3 may be formed on three valleys or divergence points DIV corresponding to alternate positions among the six valleys or divergence points DIV, and supports Lb may be formed on the other valleys or divergence points DIV on which the first to third protrusions P1, P2 and P3 are not formed. The support Lb will be described in more detail below.

In an embodiment of the present disclosure, rim portions L around (e.g., surrounding) one of multiple battery cells 10 may surround the multiple battery cells 10 while forming an angled closed loop shape. For example, a rim portion L around (e.g., surrounding) each battery cell 10 may surround the battery cell 10 while bent at each valley or a divergence point DIV, and a rim portion L around (e.g., surrounding) one of the multiple battery cells 10, e.g., the first battery cell 13, may surround the first battery cell 13 while extending in an angled closed loop shape and being bent at each valley or divergence point DIV. For example, the rim portion L around (e.g., surrounding) the first battery cell 13 may be provided such that a total of six strips extending in different directions to surround the first battery cell 13 at each valley or divergence point DIV are in contact with one another. As described below, neighboring strips extending in different directions may be in contact with each other on the valley or divergence point DIV in the outer circumferential direction of the first battery cell 13, and at a valley or divergence point DIV formed in an angular shape as neighboring strips extending in different directions are in contact with each other, a support Lb having a round end portion matching the outer circumferential surface of the first battery cell 13 may be provided from the valleys or divergence point DIV toward the outer circumferential surface of the first battery cell 13.

In an embodiment of the present disclosure, protrusions P may be provided on rim portions L each around (e.g., surrounding) one of battery cells 10 and may include first to third protrusions P1, P2 and P3 protruding from three different positions along the rim portions L around (e.g., surrounding) the battery cells 10. In this case, the first to third protrusions P1, P2 and P3 may be provided on or at (e.g., in) valleys or divergence points DIV between neighboring battery cells 10 and may interfere with outer circumferential surfaces of three neighboring battery cells 10, thereby inducing or facilitating an assembly of the three neighboring battery cells 10.

More specifically, the first to third protrusions P1, P2 and P3 may be provided on three different positions along the rim portion L around (e.g., surrounding) one of multiple battery cells 10, e.g., the first battery cell 13. In this case, the first to third protrusions P1, P2 and P3 may be provided on or at (e.g., in) valleys between every two neighboring satellite battery cells 15 in the outer circumferential direction of the first battery cell 13 and the first battery cell 13. In an embodiment of the present disclosure, the protrusion P may be provided on three alternate valleys among a total of six valleys between every two neighboring satellite battery cells 15 in the outer circumferential direction of the first battery cell 13 and supports Lb may be provided on the other valleys or divergence points DIV at which the protrusion P is not provided to support the outer circumferences of three neighboring battery cells 10. For example, the support Lb may protrude toward outer circumferential surfaces of three neighboring battery cells 10 from a divergence point DIV at which rim portions L around (e.g., surrounding) the three neighboring battery cells 10 are in contact with one another. In an embodiment of the present disclosure, the protrusion P and the support Lb may be alternately formed at alternate positions along the rim portion L around (e.g., surrounding) the first battery cell 13, and for example, the protrusion P and the support Lb may be alternately formed at alternate positions in the outer circumferential direction of the first battery cell 13. In an embodiment of the present disclosure, the protrusion P may be formed at three alternate positions along the rim portion L around (e.g., surrounding) the first battery cell 13, and the support Lb may be formed at three alternate positions at which the protrusion P is not formed along the rim portion L around (e.g., surrounding) the first battery cell 13. For example, the protrusion P and the support Lb may be each formed between three neighboring battery cells 10, i.e., between three different battery cells 10.

The support Lb may protrude from a divergence point DIV at which rim portions L around (e.g., surrounding) the three neighboring battery cells 10 are in contact with one another toward outer circumferential surfaces of three neighboring battery cells 10. In an embodiment of the present disclosure, when the support Lb protrudes from the divergence point DIV toward the outer circumferential surfaces of the three neighboring battery cells 10, it may be understood to refer to the support Lb broadly supporting the outer circumferential surfaces of the neighboring battery cells 10 while extending along the rim portion L with respect to the divergence point DIV. For example, the support Lb may extend along the rim portion L with respect to the divergence point DIV to broadly support an outer circumferential surface of each battery cell 10 and extend between protrusions P arranged at both sides along the rim portion L while a corresponding support Lb is interposed therebetween. For example, the support Lb may extend along the rim portion L not to reach the protrusions P at both sides and be provided between protrusions P at both sides. Throughout the present specification, when the support Lb supports outer circumferential surfaces of three neighboring battery cells 10, it may be understood to refer to the support Lb physically interfering with an outer circumferential surface of a battery cell 10 among the three neighboring battery cells 10, and for example, the support Lb being in contact with a battery cell 10. However, in various embodiments of the present disclosure, the support Lb may be arranged to be spaced a certain distance from the outer circumferential surface of the battery cell 10, because the support Lb may suppress or reduce movement of the battery cell 10 when the support Lb may be brought into contact with the outer circumferential surface of the battery cell 10 due to the movement of the battery cell 10 even though the support Lb may not initially be in direct contact with the outer circumferential surface of the battery cell 10.

As the protrusion P and the support Lb are formed at three alternate positions along a rim portion L extending in an angular form to surround one of multiple battery cells 10, e.g., the first battery cell 13, a round curved surface facing the outer circumferential surface of the first battery cell 13 may be formed, and for example, a side surface Pb of the protrusion P and an end portion of the support Lb may provide a round curved surface having a concave shape facing the outer circumferential surface of the first battery cell 13. In an embodiment of the present disclosure, a protrusion P and a support Lb form a round curved surface facing the outer circumferential surface of the first battery cell 13 along a rim portion L extending in an angular form in terms of rigidity and thus may provide an assembly position for stably supporting the first battery cell 13 while matching the outer circumferential surface of the first battery cell 13. In an embodiment of the present disclosure, a narrow portion Lc having a relatively narrow width and concavely recessed may be formed between the protrusion P and the support Lb along a rim portion L around (e.g., surrounding) an outer circumferential surface of the first battery cell 13, and the narrow portion Lc of the rim portion L may provide a round curved surface facing the outer circumferential surface of the first battery cell 13 between a side surface Pb of the protrusion P and the support Lb. In an embodiment of the present disclosure, the narrow portion Lc of the rim portion L may form a round curved surface continuously connecting the outer circumferential surface of the first battery cell 13 along the outer circumferential surface of the first battery cell 13, together with the protrusion P and the support Lb, and in this case, the narrow portion Lc of the rim portion L is connected to the protrusion P and the support Lb between the protrusion P and the support Lb, thereby providing a round curved surface entirely around (e.g., surrounding) the outer circumferential surface of the first battery cell 13.

A contact protrusion La protruding toward the outer circumferential surface of the first battery cell 13 may be provided inside the rim portion L around (e.g., surrounding) the first battery cell 13. In an embodiment of the present disclosure, the contact protrusion La may be formed on the narrow portion Lc having a relatively narrow width and concavely recessed along the rim portion L around (e.g., surrounding) the first battery cell 13. In an embodiment of the present disclosure, the contact protrusion La may be interference fitted into the outer circumferential surface of the first battery cell 13, and may be, for example, brought into close contact with the outer circumferential surface of the first battery cell 13, thereby firmly fixing the position of the first battery cell 13. In an embodiment of the present disclosure, as the first battery cell 13 is assembled, the contact protrusion La may be transformed and thus be brought into close contact and interference fitted with the outer circumferential surface of the first battery cell 13.

The contact protrusion La may be transformed and brought into close contact with the outer circumferential surface of the first battery cell 13 as the first battery cell 13 is assembled. For example, the contact protrusion La may be rubbed or interfere physically with the first battery cell 13 assembled in the height direction Z3 and thus be pushed toward a direction opposite to the first battery cell 13 to be in close contact with the outer circumferential surface of the first battery cell 13. In an embodiment of the present disclosure, the contact protrusion La may protrude toward an innermost side of the round curved surface consecutively around (e.g., surrounding) the outer circumferential surface of the first battery cell 13) toward a center of the first battery cell 13 to be brought in contact with the outer circumferential surface of the first battery cell 13. In an embodiment of the present disclosure, the round curved surface consecutively around (e.g., surrounding) the outer circumferential surface of the first battery cell 13 may directly face the outer circumferential surface of the first battery cell 13, and may include, for example, the side surface Pb of the protrusion P and the support Lb and include the narrow portion Lc of the rim portion L between the side surface Pb of the protrusion P and the support Lb. In an embodiment, the contact protrusion La protruding toward the outer circumferential surface of the first battery cell 13 from the narrow portion Lc of the rim portion L may form a structure protruding toward the innermost side of the round curved surface consecutively around (e.g., surrounding) the outer circumferential surface of the first battery cell 13 toward the center of the first battery cell 13.

The contact protrusion La may protrude by a certain length from the narrow portion Lc having a narrow width and concavely recessed along the rim portion L around (e.g., surrounding) the first battery cell 13 toward the outer circumferential surface of the first battery cell 13, thereby appropriately setting a position of the contact protrusion La to allow the assembly of the first battery cell 13 and to be sufficiently interference fitted with the outer circumferential surface of the first battery cell 13. For example, the contact protrusion La may be formed to protrude toward the first battery cell 13 from the narrow portion Lc recessed concavely to maintain an appropriate or suitable length in consideration of a process of forming the contact protrusion La and to prevent or substantially prevent the contact protrusion La from excessively protruding not to block or reduce the assembly of the first battery cell 13.

The contact protrusions La may be formed at symmetrical positions along the rim portion L around (e.g., surrounding) the first battery cell 13 to be interference fitted with the first battery cell 13 at the symmetrical positions and balance the position of the first battery cell 13. For example, the contact protrusion La may be formed between three protrusions P and three supports Lb alternately formed at alternate positions along the rim portion L around (e.g., surrounding) the first battery cell 13 and may be formed a total of six symmetrical positions along the rim portion L. In an embodiment of the present disclosure, a total of six narrow portions Lc and a total of six contact protrusions La may be formed at positions between the protrusion P and the support Lb along the rim portion L around (e.g., surrounding) the first battery cell 13.

In the battery pack 1 according to an embodiment of the present disclosure, a relation between the positions of the battery cell 10 and the lower holder W2 having the contact protrusion La to be interference fitted with the battery cell 10, and for example, the relation between the heights of the battery pack 10 and the lower holder W2 in the height direction Z3 according to the assembly direction of the battery pack 10 will be described with reference to FIG. 16 below. In an embodiment of the present disclosure, in the lower holder W2, rim portions L each around (e.g., surrounding) one of multiple battery cells 10 the lower holder W2 may be connected to one another in a net form, thereby forming the main surface W2*m* of the lower holder W2. In this case, the main surface W2*m* of the lower holder W2 may correspond to a surface of the lower holder W2 having a largest area and include a main surface W2*m* facing the upper holder W1 and a main surface W2*m* opposite to the upper holder W1. In an embodiment of the present disclosure, the lower holder W2 may include a main surface W2*m* on which rim portions L each around (e.g., surrounding) one of battery cells 10 are connected in a net form, and include an upper main surface S1 and a lower main surface S2 forming opposite main surfaces W2*m* in the height direction Z3, and for example, an upper main surface S1 facing the upper holder W1 and a lower main surface S2 opposite to the upper holder W1.

In an embodiment of the present disclosure, the battery cell 10 assembled with the lower holder W2 may include an upper end and a lower end in the height direction Z3, and in this case, the lower end of the battery cell 10 may be at a lower level (e.g., a lower height) than the main surface W2*m* of the lower holder W2, i.e., the lower main surface S2 of the lower holder W2 and may protrude, for example, to a fixing depth t from the lower main surface S2 of the lower holder W2. In the present specification, when the main surface W2*m* of the lower holder W2 is referred to in relation to the fixing depth t or the lower end of the battery cell 10, the main surface W2*m* of the lower holder W2 may refer to the lower main surface S2 of the main surface W2*m* of the lower holder W2. In an embodiment, in the present specification, when the main surface W2*m* of the lower holder W2 is referred to in relation to the first to third protrusions P1, P2 and P3, the main surface W2*m* of the lower holder W2 may refer to the upper main surface S1 of the main surface W2*m* of the lower holder W2.

In an embodiment of the present disclosure, the lower end of the battery cell 10 may protrude downward to the fixing depth t from the main surface W2*m* of the lower holder W2 and thus may be at a lower level (e.g., a lower height) than the main surface W2*m*. In an embodiment of the present disclosure, the fixing depth t of the lower end of the battery cell 10 when the position of the battery cell 10 is fixed may be set to a scale of about $1/10$ mm to 1 mm from the main surface W2*m* of the lower holder W2, and the scale of about $1/10$ mm to 1 mm may be understood to include a depth in a range of a scale of one decimal place to a scale of one integer. In an embodiment of the present disclosure, the fixing depth t of the battery cell 10 may be set to a depth of 0.5 mm or more from the main surface W2*m* of the lower holder W2.

In an embodiment of the present disclosure, the first to third protrusions P1, P2 and P3 (for example, the side surfaces Pb of the first to third protrusions P1, P2 and P3) inducing the assembly of the battery cell 10 toward the lower holder W2 may form circular trajectories OC and IC with diameters DO and DI gradually reducing from the first circular trajectory OC toward the second circular trajectory IC in a direction opposite to the assembly direction of the battery cell 10 in the height direction Z3, and may induce the battery cell 10 to a normal position (e.g., a desired position) to be assembled between the first to third protrusions P1, P2 and P3. The rim portion L forming a common support base of the first to third protrusions P1, P2 and P3 may be provided with the contact protrusion La for interference fitting with the battery cell 10, the contact protrusion La may be located at a lower level (e.g., a lower height) than the first to third protrusions P1, P2 and P3 on the rim portion L, e.g., at a lower level (e.g., a lower height) adjacent to the main surface W2*m* formed by the rim portion L, and thus, the fixing depth t to which the battery cell 10 is fixed while interference fitted with the contact protrusion La, i.e., a depth of the lower end of the battery cell 10 when the position of the battery cell 10 is fixed, may be at a height lower than the main surface W2*m* formed by the rim portion L, thereby achieving a sufficient interference fit between the battery cell 10 and the contact protrusion L on the rim portion L. Throughout the present specification, the fixing depth t or the height of the lower end of the battery cell 10 may refer to a depth or height of the lower end of the battery cell 10 from the main surface W2*m* of the lower holder W2 in the height direction Z3, and may be referred to as a depth or a height herein.

In an embodiment of the present disclosure, the fixing depth t of the battery cell 10 may be set such that the level of the lower end of the battery cell 10 is lower than the rim portion L with the contact protrusion La interference fitted with the battery cell 10 or the level of the main surface W2*m* formed by the rim portion L, and the lower end of the battery cell 10 may protrude to be lower than the rim portion L or the main surface W2*m* formed by the rim portion L and protrude to the fixing depth t from the rim portion L or the main surface W2*m* formed by the rim portion L.

In an embodiment of the present disclosure, the fixing depth t of the battery cell 10 (e.g., a depth of the lower end of the battery cell 10 when the position of the battery cell 10 is fixed) may be at a lower height than the rim portion L provided with the contact protrusion La interference fitted with the battery cell 10, thereby firmly fixing the position of the battery cell 10. For example, the lower end of the battery cell 10 may be at a lower level (e.g., a lower height) by the fixing depth t than at least the rim portion L provided with the contact protrusion La and thus the position of the battery cell 10 may be firmly fixed through physical interference or interference fit between the battery cell 10 and the contact protrusion La and through sufficient interference between the battery cell 10 and the contact protrusion La according to the assembly direction of the battery cell 10, and in this case, the fixing depth t to which the lower end of the battery cell 10 protrudes downward from the rim portion L may correspond a certain assembly tolerance or margin for achieving physical interference or interference fit between the battery cell 10 and the contact protrusion La.

Referring to FIG. 1, in an embodiment of the present disclosure, the battery cell 10 may be connected (e.g., electrically connected) through the upper end thereof and may be cooled through the lower end thereof. For example, in an embodiment of the present disclosure, multiple battery cells 10 may be connected (e.g., electrically connected) in parallel or series through the electrodes 11 and 12 and the bus bar B on the upper end of the battery cell 10, and may be cooled through the lower end of the battery cell 10, i.e., the lower end of the battery cell 10 exposed to the fixing depth t from the lower holder W2. In an embodiment of the present disclosure, multiple bus bars B may be provided on the upper holder W1 into which the upper end of the battery cell 10 is fitted to electrically connect multiple battery cells 10, and a cooling plate 70 (see FIG. 1) configured to be in thermal contact with the multiple battery cells 10 may be provided below the lower holder W2 into which the lower end of the battery cell 10 is fitted. For example, the bus bars B may be provided on the upper holder W1 to be connected (e.g., electrically connected) to the upper end of the battery cell 10 (for example, the electrodes 11 and 12 on the upper end of the battery cell 10), and the cooling plate 70 may be provided below the lower holder W2 to be in thermal contact with the lower end of the battery cell 10 (for example, the lower ends of the battery cells 10 exposed to the fixing depth 5 from the lower holder W2). Here, when the cooling plate 70 is in thermal contact with the lower end of the battery cell 10, it may be understood to include that the cooling plate 70 and the lower end of the battery cell 10 are in direct contact with each other or are located adjacent to each other to exchange heat with each other even if they are not in direct contact with each other. In an embodiment of the present disclosure, the electrical connection of the battery cell 10 and the cooling of the battery cell 10 may be performed through the upper and lower ends of the battery cell 10 spaced from each other in the height direction Z3, so that the electrical connection and cooling of the battery cell 10 may be smoothly performed by preventing or substantially preventing interference between electrical connection and cooling of the battery cell 10. For example, unlike in the present disclosure, when the battery cell 10 is connected (e.g., electrically connected) through both the upper and lower ends of the battery cell 10, the lower end of the battery cell 10 need to include both an electrical connection structure and a cooling structure, and for example, an additional insulation structure for insulation between the electrical connection structure and the cooling structure, thereby complicating the entire configuration of the battery pack 1.

Figure 17:
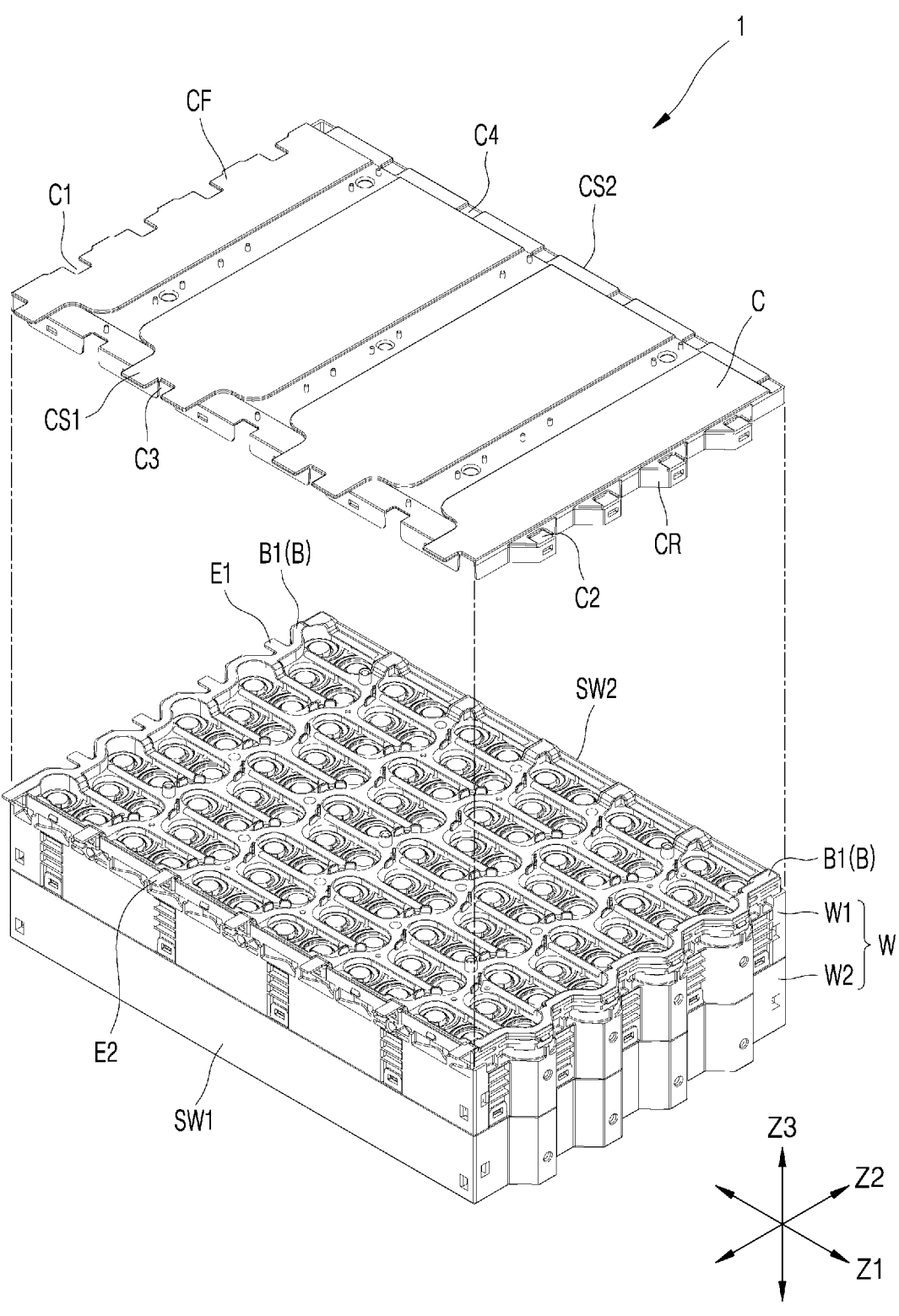
FIG. 17 is an exploded perspective view of a battery pack according to an embodiment of the present disclosure, which is provided to describe a structure of a cover.
Figure 18:
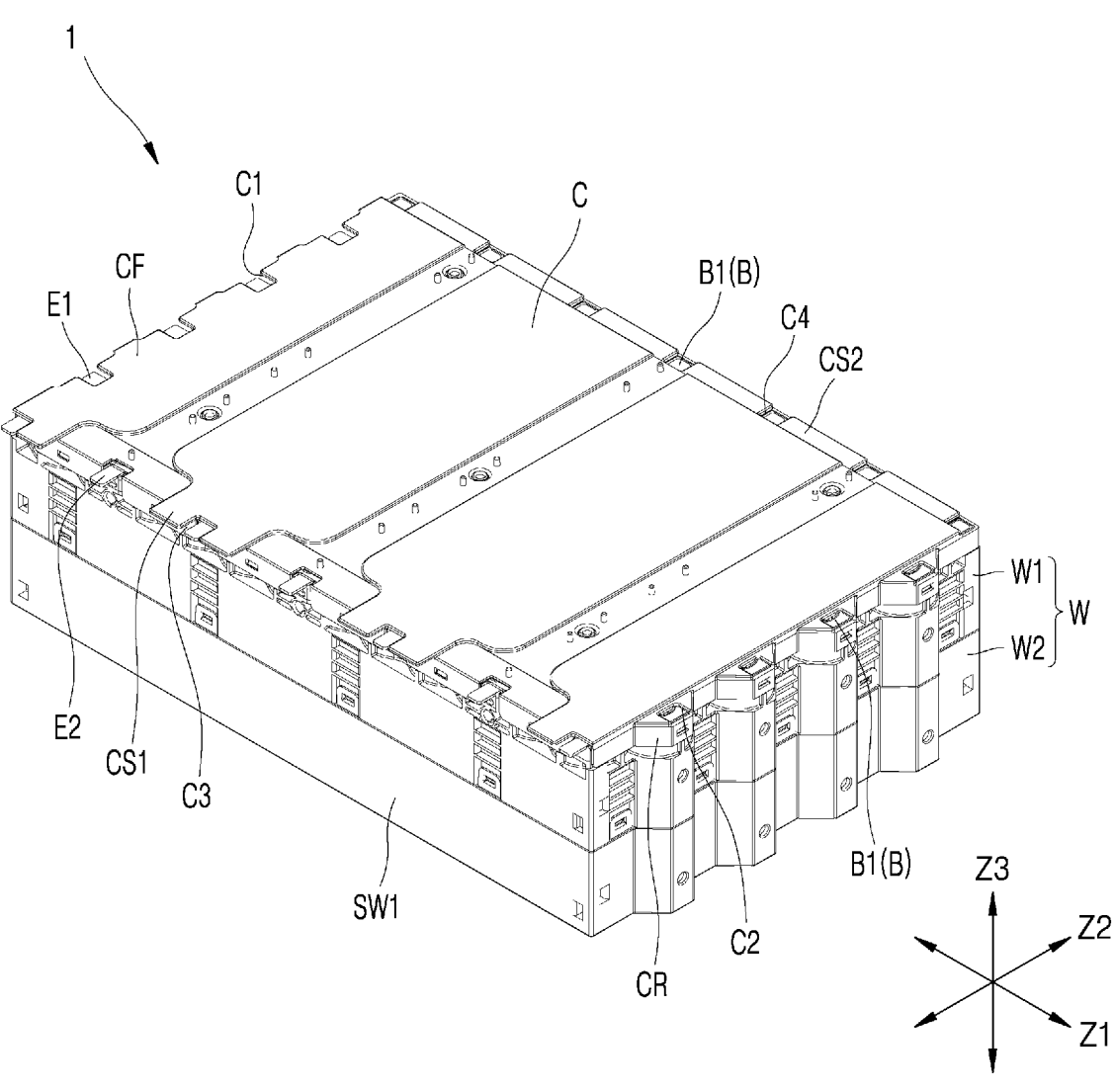
FIG. 18 is a perspective view of a battery pack assembled with the cover of FIG. 17.

FIG. 17 is an exploded perspective view of a battery pack according to an embodiment of the present disclosure, which is provided to describe an assembly of a cover. FIG. 18 is a perspective view of a battery pack assembled with the cover of FIG. 17.

Referring to FIGS. 17 and 18, in an embodiment of the present disclosure, a cover C may be disposed on a cell holder W. The cover C may include a front side CF and a rear side CR facing each other in the column direction Z1 and a first side wall CS1 and a second side wall CS2 facing each other in the row direction Z2. In this case, in order to form a module 100 expanded in the column direction Z1, the front side CF and the rear side CR may be provided with a first extension piece E1 extending from a main body B1 of a foremost bus bar B and openings C1 and C2 for partially exposing the main body B1 of the foremost bus bar B. In more detail, the front side CF may be provided with the front opening C1 for exposing the first extension piece E1 extending from the main body B1 of the foremost bus bar B, and the rear side CR may be provided with the rear opening C2 for partially exposing the main body B1 of the rearmost bus bar B. In the expanded module 100 with multiple battery packs 1 arranged in the column direction Z1, as the first extension piece E1 exposed via a front opening C1 of a battery pack 1 and a main body B1 of a bus bar B exposed via a rear opening C2 of a neighboring battery pack 1 in the column direction Z1 overlap each other, a foremost bus bar B and a rearmost bus bar B of the neighboring battery packs 1 in the column direction Z1 are connected (e.g., electrically connected) and in this case, the first extension piece E1 and the main body B1 of the bus bar B exposed from the front side CF and the rear side CR of the cover C may be combined by welding and/or the like, thereby easily connecting (e.g., electrically connecting) the neighboring battery packs 1. For example, in an embodiment of the present disclosure, the neighboring battery packs 1 in the column direction Z1 may have substantially the same structure, and the expanded module 100 with the multiple battery packs 1 in the column direction Z1 may be provided by arranging battery packs having the same structure in the column direction Z1. To this end, in the battery pack 1 according to an embodiment of the present disclosure, the front opening C1 of the front side CF of the cover C and the rear opening C2 of the rear side CR of the cover C may be formed at opposite positions in corresponding columns in the column direction Z1 and thus the first extension piece E1 extending from the foremost bus bar B exposed via the front opening C1 and the rearmost bus bar B exposed via the rear opening C2 may be combined with each other at corresponding positions in the column direction Z1.

Similarly, in order to form the module 100 expanded in the row direction Z2, the first and second sides CS1 and CS2 of the cover C may be provided with a second extension piece E2 extending from an outermost position on a side of the main body B1 of the bus bar B in the row direction Z2 and openings C3 and C4 for exposing an outermost position on an opposite side of the main body B1 of the bus bar B. In an embodiment of the present disclosure, the first side CS1 may be provided with the first side opening C3 for exposing a second extension piece E2 extending from the outermost position on the one side of the main body B1 of the bus bar B in the row direction Z2, and the second side CS2 may be provided with the second side opening C4 for exposing the outermost position on the opposite side of the main body B1 of the bus bar B in the row direction Z2. In the expanded module 100 with multiple battery packs 1 arranged in the row direction Z2, as the second extension piece E2 exposed via a first side opening C3 of a battery pack 1 and a main body B1 of a bus bar B exposed via a second side opening C4 of a neighboring battery pack 1 in the row direction Z2 overlap each other, the bus bars B of the neighboring battery packs 1 in the row direction Z2 may be connected (e.g., electrically connected) and in this case, the second extension piece E2 and the bus bar B (e.g., an outermost position on the bus bar B in the row direction Z2) exposed via the first and second sides CS3 and CS4 of the cover C may be connected by welding and/or the like, thereby easily connecting (e.g., electrically connecting) the neighboring battery packs 1. For example, in an embodiment of the present disclosure, neighboring battery packs 1 in the row direction Z2 may have substantially the same structure, and the expanded module 100 with the multiple battery packs 1 in the row direction Z2 may be provided by arranging battery packs having the same structure in the row direction Z2. To this end, in the battery pack 1 according to an embodiment of the present disclosure, the first and second side openings C3 and C4 of the first and second sides CS1 and CS2 of the cover C may be formed at opposite positions in corresponding rows in the row direction Z2 and thus the second extension piece E2 exposed via the first side opening C3 and the bus bar B (e.g., an outermost position on the bus bar B in the row direction Z2) exposed via the second side opening C4 may be provided at corresponding positions, and because the first and second side openings C3 and C4 are formed at the opposite positions in the row direction Z2, the second extension piece E2 exposed via the first side opening C3 and the bus bar B (e.g., the outermost position on the bus bar B in the row direction Z2) exposed via the second side opening C4 may be combined with each other at corresponding positions in the row direction Z2.

In an embodiment of the present disclosure, the openings C1, C2, C3 and C4 may be formed in a notch form or a hole form. For example, the front opening C1 and the first side opening C3 for exposing the first and second extension pieces E1 and E2 may be provided in the notch form, and the front side CF and the first side CS1 near the first and second extension pieces E1 and E2 may protect the first and second extension pieces E1 and E2 from an external environment while around (e.g., surrounding) the first and second extension pieces E1 and E2 in an open loop form with one side open. In an embodiment of the present disclosure, the rear opening C2 and the second side opening C4 for partially exposing the bus bar B in the column direction Z1 and the row direction Z2 may be in the form of a hole and the rear side CR and the second side CS2 near the bus bar B exposed to the outside may protect a portion of the bus bar B exposed to the outside while around (e.g., surrounding) the portion of the bus bar B in the form of a closed loop form.

Figure 19:
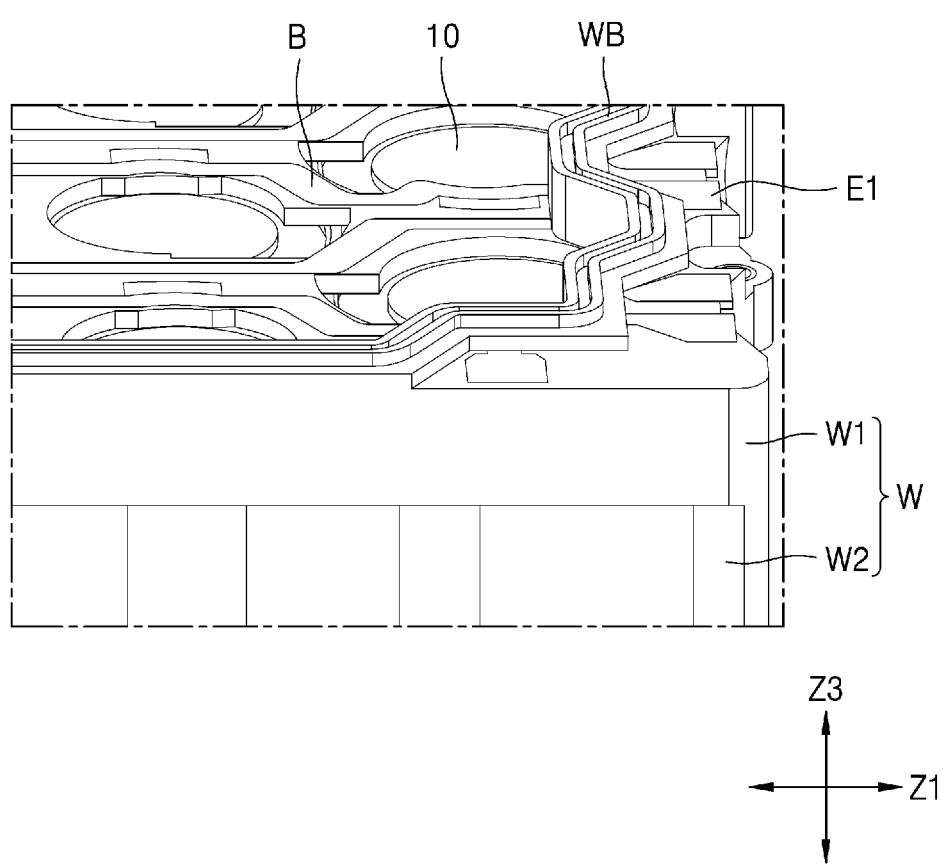
FIG. 19 is a perspective view of a cell holder of a battery pack according to another embodiment of the present disclosure.
Figure 20:
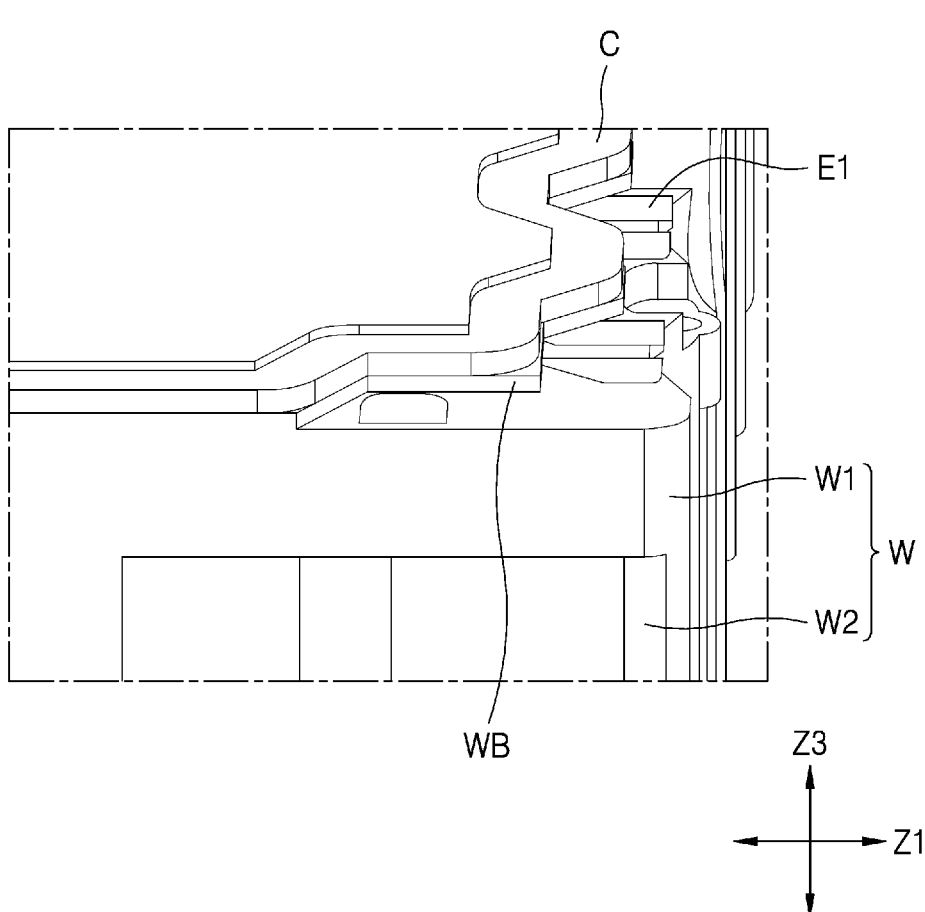
FIG. 20 is a perspective view illustrating a state in which a cover is assembled on the cell holder of FIG. 19.

FIG. 19 is a perspective view of a cell holder of a battery pack according to another embodiment of the present disclosure. FIG. 20 is a perspective view illustrating a state in which a cover is assembled on the cell holder of FIG. 19.

Referring to FIGS. 19 and 20, a cell holder W may include a welding bead portion WB to be welded with a cover C. For example, in an embodiment of the present disclosure, the welding bead portion WB may be formed at a position on the cell holder W in contact with the cover C. A bus bar B and the cover C may be arranged on the cell holder W, the cell holder W and the cover C, which are coupled with each other while facing each other in the height direction Z3, may be formed to be in direct contact with each other, and the cell holder W may be brought into direct contact with the cover C through the welding bead portion WB.

The welding bead portion WB forms a coupling portion, and for example, a coupling portion between the cell holder W and the cover C while being in direct contact with the cover C. In an embodiment of the present disclosure, the welding bead portion WB may form a coupling portion with the cover C while in direct contact with the cover C and may be formed at a level on the cell holder W closest to the cover C, i.e., a level closest to the cover C in the height direction Z3. As described below, the welding bead portion WB is formed at a higher level than the bus bar B supported on the cell holder W or an extension piece E1 extending from the bus bar B, and may extend across the extension piece E1 extending to the outside of an accommodation space accommodating the bus bar B.

In an embodiment of the present disclosure, the welding bead portion WB may surround the accommodation space of the cell holder W in the form of a closed loop along the periphery of the cell holder W to seal the battery cell 10 and the bus bar B in the accommodation space of the cell holder W from an external environment. In an embodiment of the present disclosure, the welding bead portion WB may extend across the extension piece E1 extending from the bus bar B in the column direction Z1 and the row direction Z2 while around (e.g., surrounding) the bus bar B in the accommodation space. Throughout the present specification, when the welding bead portion WB extends across the extension piece E1 extending from the main body B1 of the bus bar B, it may be understood to refer to the welding bead portion WB extending at a higher level (e.g., a greater height) than the extension piece E1 while crossing the extension piece E1, and because the welding bead portion WB extending at the higher level (e.g., the greater height) than the extension piece E1 in the height direction Z3 while crossing the extension piece E1, the welding bead portion WB may extend at a higher level (e.g., a greater height) than at least the extension piece E1, i.e., at a level closer to the cover C in the height direction Z3 than at least the extension piece E1, while crossing the extension piece E1. The welding bead portion WB may form a coupling portion with the cover C in direct contact with the cover C at a height closer to the cover C than the extension piece E1. In an embodiment of the present disclosure, the welding bead portion WB may form a coupling portion between the cell holder W and the cover C by welding, and for example, by laser welding. In an embodiment of the present disclosure, the cell holder W and the cover C may be formed of a polymer resin material, e.g., engineering plastic, to form a coupling portion relative to each other by laser welding or formed of a material having affinity to form a coupling portion firmly relative to each other, and in an embodiment of the present disclosure, the cell holder W and the cover C may be formed of the same polymer region material on which laser welding may be performed.

Throughout the present specification, when the welding bead portion WB extends across the extension piece E1, it may be understood to refer to the welding bead portion W extending across the extension piece E1 extending from the bus bar B to the outside the accommodation space while around (e.g., surrounding) the accommodation space accommodating the bus bar B, and in various embodiments of the present disclosure, an object surrounded by the welding bead portion WB is not limited to the extension piece E1 extending from the bus bar B and may comprehensively refer to a portion of the bus bar B from which the extension piece E1 extends, an interface between the extension piece E1 and the bus bar B, and/or the like. For example, the welding bead portion WB may extend across a portion of the bus bar B from which the extension piece E1 extends or the interface between the extension piece E1 and the bus bar B rather than the extension piece E1 according to the alignment of positions of the cell holder W and the bus bar B or assembly tolerance. In this case, the welding bead portion WB may also extend across a portion of the bus bar B to which the extension piece E1 is connected or the interface between the extension piece E1 and the bus bar B to surround the accommodation space accommodating the bus bar B and the battery cell 10.

Hereinafter, a fastening structure between the cover C and the upper holder W1 and a fastening structure between the upper holder W1 and the lower holder W2 are described with reference to FIGS. 1 to 4.

Referring to FIGS. 1 and 2, the cover C and the upper holder W1 may be assembled to face each other with the plurality of bus bars B therebetween, and a first fastener 81 of the cover C and a second fastener 82 of the upper holder W1 may be formed to have complementary shapes at positions corresponding to each other to be inserted into each other. For example, any one fastener 81 or 82 among the first and second fasteners 81 and 82 may be formed in a hook form, and the other fastener 81 or 82 may be formed in a hole form that may accommodate the hook form.

In an embodiment of the disclosure, front wall FW and a rear wall RW facing each other in the column direction Z1 may be arranged in the first and second zigzag forms, and more particularly, the front wall FW may be formed in the first zigzag form including the first convex portion F1 and the first concave portion F2, and the rear wall RW may be formed in the second zigzag form including the second convex portion R1 and the second concave portion R2. Further, in an embodiment of the disclosure, the first and second side walls SW1 and SW2 facing each other in a row direction Z2 may be formed in a flat form.

In an embodiment of the disclosure, the second fastener 82 of the upper holder W1 may be formed on at least one wall FW, RW, SW1, or SW2 among the front wall FW, the rear wall RW, and the first and second side walls SW1 and SW2, and the second fastener 82 of the upper holder W1 may be formed on the entire front wall FW, rear wall RW, and first and second walls SW1 and SW2.

In an embodiment of the disclosure, the second fastener 82 may be formed on the first convex portion F1 of the front wall FW and the second convex portion R1 of the rear wall RW among the front wall FW and the rear wall RW formed in the first and second zigzag forms. The second fastener 82 is formed on the first and second convex portions F1 and R1 of the upper holder W1 that is more protruded to the outside among the upper holders W1, and thus, physical interference may be minimized when being fastened to the first fastener 81 and may be more firmly fastened to the first fastener 81. In an embodiment of the disclosure, the second fastener 82 may be formed on each of the first and second convex portions F1 and R1 of the front wall FW and the rear wall RW, and, as described above, the second fastener 82 formed on each of the front wall FW and the rear wall RW may be formed intermittently with gaps between adjacent first convex portions F1 or formed intermittently with gaps between adjacent second convex portions R1. In addition, in an embodiment of the disclosure, through the first concave portion F2 (or the second concave portion R2) formed between the adjacent first convex portions F1 (or the second convex portions R1), or the first concave portion F2 (or the second concave portion R2) formed between the adjacent second fasteners 82 formed on the adjacent first convex portions F1 (or second the convex portions R1), for the purpose of reassembly due to incorrect assembly of the cover C or for a maintaining purpose such as inspection and repairing of the battery pack, the cover C may be easily detached, and, through, for example, a recessed portion of the first concave portion F2 (or the second concave portion R2), the cover C may be easily detached.

In an embodiment of the disclosure, the second fastener 82 of the upper holder W1 may be formed on the first and second side walls SW1 and SW2 that are formed to be relatively flat, and the plurality of second fasteners 82 may be arranged along the first and second side walls SW1 and SW2 in certain intervals. In an embodiment of the disclosure, a recess 60 may be formed in a position adjacent to the second fastener 82 of the upper holder W1, and the upper holder W1 may be easily detached through the recess 60. In an embodiment of the disclosure, the recess 60 may be formed along the first and second side walls SW1 and SW2 at a position corresponding to the second fastener 82, and may be formed at a lower position adjacent to the second fastener 82.

Referring to FIGS. 1 to 3, the upper holder W1 and the lower holder W2 may be combined to face each other with the plurality of battery cells 10 therebetween, and a third fastener 83 of the upper holder W1 and a fourth fastener 84 of the lower holder W2 may be formed to have complementary shapes at positions corresponding to each other to be inserted into each other. For example, any one fastener 83 or 84 among the third and fourth fasteners 83 and 84 may be formed in a hook form, and the other fastener 83 or 84 may be formed in a hole form that may accommodate the hook form. In an embodiment of the disclosure, the third fastener 83 of the upper holder W1 may be formed in a hook form, and the fourth fastener 84 of the lower holder W2 may be formed in a hole form.

In an embodiment of the disclosure, the second and third fasteners 82 and 83 of the upper holder W1 are formed to be inserted into the cover C and the lower holder W2, respectively, and to avoid physical interference with each other, the second and third fasteners 82 and 83 may be formed at different levels along the height direction Z3, and may be formed at positions that do not overlap with each other along the extension direction of the walls FW, RW, SW1, and SW2. For example, in an embodiment of the disclosure, the second and third fasteners 82 and 83 may be formed together along the front wall FW and the rear wall RW, but when the second fastener 82 is formed on the first and second convex portions F1 and R1 of the front wall FW and the rear wall RW, the third fastener 83 may be formed on the first and second concave portions F2 and R2 of the front wall FW and the rear wall RW, and thus, the second and third fasteners 82 and 83 may be formed at positions that do not overlap with each other along the front wall FW and the rear wall RW. In an embodiment of the disclosure, the second and third fasteners 82 and 83 may be formed at levels that do not overlap with each other along the height direction Z3 at which the cover C, the upper holder W1, and the lower holder W2 are assembled to each other, and, for example, the second fastener 82 fastened to the cover C may be formed adjacent to the cover C at a relatively high level along the height direction Z3, and the third fastener 83 fastened to the lower holder W2 may be formed adjacent to the lower holder W2 at a relatively low level along the height direction Z3.

The fourth fastener 84 of the lower holder W2 may be formed in a hole 84*b* form that is formed to penetrate through a protruding piece 84*a* (refer to FIG. 3) protruding upwards toward the upper holder W1, and may be formed intermittently along the front wall FW, the rear wall RW, and the first and second side walls SW1 and SW2. The fourth fastener 84 of the lower holder W2 may be formed at a position corresponding to the third fastener 83 of the upper holder W1 and, for example, may be formed at positions corresponding to the first and second concave portions F2 and R2 of the front wall FW and the rear wall RW. In an embodiment of the disclosure, the third and fourth fasteners 83 and 84 formed at positions corresponding to each other may be formed in the first and second concave portions F2 and R2 of the front wall FW and the rear wall RW, and may be formed at positions corresponding to each other on the first and second side walls SW1 and SW2.

In an embodiment of the disclosure, a separate insertion piece I for improving the fastening strength between the upper holder W1 and the lower holder W2, that is, between the third and fourth fasteners 83 and 84, may be formed on the first and second side walls SW1 and SW2 of the lower holder W2. The insertion piece I may be inserted, together with the fourth fastener 84, into opposite walls of the first and second side walls SW1 and SW2 of the upper holder W1, along a direction of the thickness of the first and second side walls SW1 and SW2, and the fourth fastener 84 and the insertion piece I formed together on the first and second side walls SW1 and SW2 of the lower holder W2, and more particularly, alternately formed along the first and second side walls SW1 and SW2 of the lower holder W2, may be inserted into opposite walls of the first and second side walls SW1 and SW2 of the upper holder W1, and thus, the upper holder W1 may be more firmly fastened to the lower holder W2. For example, in an embodiment of the disclosure, the fourth fastener 84 may be inserted into the outer surfaces of the first and second side walls SW1 and SW2 and the second side wall SW2 of the upper holder W1, and the insertion piece I may be inserted into the inner surfaces of the first and second side walls SW1 and SW2 of the upper holder W1. In this case, the fourth fastener 84 may be inserted into the outer surfaces of the first and second side walls SW1 and SW2 of the upper holder W1, and may be inserted into the third fastener 83 formed in a recess 40 that is relatively recessed inwardly on the outer surface of the first and second side walls SW1 and SW2 of the upper holder W1, thereby reducing a fastening resistance generated when fastening the upper holder W1 to the lower holder W2. For example, the fourth fastener 84 and the insertion piece I alternately provided along the first and second side walls SW1 and SW2 of the lower holder W2 may be inserted into the outer and inner surfaces of the first and second side walls SW1 and SW2 of the upper holder W1, respectively, and may be inserted into the third fastener 83 formed in a recess 40 that is relatively recessed inwardly on the outer surface of the first and second side walls SW1 and SW2 of the upper holder W1, thereby reducing a fastening resistance generated when fastening the upper holder W1 to the lower holder W2. In this case, the recess 40 may be formed consecutively from a bottom of the upper holder W1 through the whole height of the upper holder W1, along the height direction Z3 in which the upper holder W1 and the lower holder W2 are assembled to each other, that is, along a sliding direction of the fourth fastener 84, and reinforcing ribs 41 for compensating for a decrease in strength due to the recesses 40 may be formed at a higher level than that of the third fastener 83 into which the fourth fastener 84 is inserted, that is, at a level irrelevant to an assembly of the third and fourth fasteners 83 and 84. The reinforcing rib 41 may be formed not only on the first and second side walls SW1 and SW2 of the upper holder W1, but also on the front wall FW and the rear wall RW, for example, on the first and second concave portions F2 and R2 in which the third fastener 83 is formed among the front wall FW and the rear wall RW, and at a level higher than the third fastener 83, that is, a level irrelevant to the assembly of the third and fourth fasteners 83 and 84.

Referring to FIG. 2, in an embodiment of the disclosure, a guide rib BG1 and a guide protrusion BG2 for guiding the assembly of the bus bar B may be formed on the upper holder W1. A guide rib BG1 and a guide protrusion BG2 extending along the zigzag line of the bus bar B and thereby guiding a placement position of the bus bar B may be formed on the upper holder W1 on which the bus bar B is placed. The guide rib BG1 and the guide protrusion BG2 may guide an assembly position of the bus bar B along the zigzag line along which the bus bar B extends, at both sides of the bus bar B, and the guide rib BG1 may extend longer than the guide protrusion BG2 such that it guides the movement of the potting resin (not shown) for protecting the bonding portion of the connection member 50 (refer to FIG. 16) on the bus bar B, and may be formed to surround an opening OP that exposes the upper end of the battery cell 10. For example, the guide rib BG1 and the guide protrusion BG2 may protrude, on the upper holder W1, discontinuously along a zigzag line on which the bus bar B is placed and the guide rib BG1 may be formed to surround the opening OP that exposes the upper end of the battery cell 10, and a portion of the guide rib BG1 may extend along the zigzag line along which the bus bar B extends to thereby guide the placement position of the bus bar B.

Referring to FIG. 2, in an embodiment of the disclosure, a plurality of ventilation holes W1' may be formed on the upper holder W1 on which the bus bar B is placed, the ventilation hole W1 may prevent the formation of bubbles that may be trapped between the upper holder W1 and the bus bar B, and may put the bus bar B in close contact with the upper holder W1. Further, an assembly pin BP into which the assembly hole B' (refer to FIG. 1) of the bus bar B is inserted may be formed on the upper holder W1 in which the bus bar B is placed, and the placement position of the bus bar B may be maintained in position through the assembly of the assembly hole B' and the assembly pin BP. In this case, some of the assembly holes B' of the assembly holes B' formed in the bus bar B may be inserted into the hollow protrusion H described above, and, in this sense, the hollow protrusion H may be inserted into the assembly hole B' of the bus bar B and may act as an assembly pin BP for maintaining the bus bar B in position.

Referring to FIG. 2, in an embodiment of the disclosure, a first extension piece guide EG1 for guiding the assembly position of the first extension piece E1 may be formed on the front wall FW corresponding to a first extension side among the front wall FW and the rear wall RW, and a second extension piece guide EG2 for guiding the assembly position of the second extension piece E2 may be formed on the first side wall SW1 corresponding to the second extension side among the first and second side walls SW1 and SW2.

A void 90 to prevent deformation of the upper holder W1 on which the bus bar B is placed may be formed on the front wall FW and the rear wall RW, and, through the void 90 formed on the front wall FW and the rear wall RW, a flat support surface with respect to the bus bar B positioned directly above the front wall FW and the rear wall RW may be provided. For example, in an embodiment of the disclosure, a plurality of voids 90 may be provided on the front wall FW and the rear wall RW of the upper holder W1, and the process of forming the upper holder W1, for example, injecting a molten high-temperature resin into the mold for the upper holder W1, preventing the deformation of the upper holder W1 due to the cooling and contraction of the upper holder W1 in the process of releasing and cooling the mold at room temperature, and in particular, the plurality of voids 90 may be formed on the front wall FW and the rear wall RW so that a flat support surface with respect to the bus bar B may be provided by preventing the deformation of the front wall FW and the rear wall RW of the upper holder W1 on which the bus bar B is directly placed.

Referring to FIGS. 7 and 9, a protective protrusion PP for protecting the hollow protrusion H may be formed on the cover C. As described above, the height of the hollow protrusion H may be designed to be substantially the same as the height of the outer surface of the cover C or lower than the height of the outer surface of the cover C, and the plurality of protection protrusions PP for protecting the hollow protrusions H may be formed at a plurality of locations on the cover C so that the hollow protrusion H protruding from the outer surface of the cover C is not damaged from an impact with an external object (not shown) approaching to the outer surface of the cover C. The protective protrusion PP may be protruded from the outer surface of the cover C and may be formed to have an appropriate height in consideration of the height of the hollow protrusion H, which may protrude from the outer surface of the cover C. In an embodiment of the disclosure, although the plurality of protection protrusions PP may be formed over a plurality of different locations on the cover C, a pair of the protection protrusions PP may be formed at least on both sides of the hollow protrusion H.

According to the present disclosure, battery pack scalability may be provided, whereby a module with various suitable outputs and capacities may be provided by setting a battery pack having the same structure to one unit and connecting such multiple battery packs to one another, and various suitable outputs and capacities may be adaptively achieved using battery packs having the same structure by increasing or reducing the number of battery packs to be included in a module.

According to the present disclosure, a battery pack with a cell holder having a structure improved to guide battery cells to a normal position (e.g., a desired position) to be assembled together and firmly fix positions of the battery cells may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various suitable changes in form and details may be made therein without departing from the spirit and scope of the present disclosure as defined by the following claims and equivalents thereof.

What is claimed is:
1. A battery pack comprising:
multiple battery cells; and
a cell holder assembled with the multiple battery cells, the cell holder comprising:
a rim portion around an outer circumference of a first battery cell from among the multiple battery cells;
multiple protrusions at positions along the rim portion and protruding from the rim portion in a height direction; and
a divergence point between adjacent protrusions of the multiple protrusions,
wherein side surfaces of the multiple protrusions facing the outer circumference of the first battery cell have a gradient in the height direction, and
wherein a lower end of the first battery cell protrudes by a depth from a lowermost surface of the rim portion in a direction opposite the height direction.
2. The battery pack of claim 1, wherein the side surfaces of the multiple protrusions define a trajectory having a diameter that increases in the height direction.
3. The battery pack of claim 1, wherein the side surfaces of the multiple protrusions define a trajectory having a diameter that decreases in an assembly direction of the first battery cell in the height direction.
4. The battery pack of claim 1, wherein the side surfaces of the multiple protrusions extend from the rim portion forming a common support base of the multiple protrusions to protruding end portions of the multiple protrusions opposite to the rim portion.

5. The battery pack of claim 4, wherein the side surfaces of the multiple protrusions connect the rim portion to the protruding end portions in the height direction.

6. The battery pack of claim 4, wherein a diameter of a first trajectory defined by the side surfaces of the multiple protrusions in contact with the protruding end portions is greater than a diameter of a second trajectory defined by the side surfaces of the multiple protrusions in contact with the rim portion, and the diameters of the first and second trajectories are greater than a diameter of the first battery cell.

7. The battery pack of claim 1, wherein the multiple battery cells comprise six satellite battery cells around the first battery cell in a direction of the outer circumference of the first battery cell, wherein valleys are provided between every two neighboring satellite battery cells and the first battery cell in the direction of the outer circumference of the first battery cell, wherein a total number of six valleys are in the direction of the outer circumference of the first battery cell, and wherein the multiple protrusions comprise a first protrusion, a second protrusion, and a third protrusion provided in valleys at alternate positions along the rim portion around the outer circumference of the first battery cell.

8. The battery pack of claim 7, further comprising supports having a round shape and concavely recessed toward an outer circumferential surface of the first battery cell from valleys from among the valleys that are at three alternate positions at which the first protrusion, the second protrusion, and the third protrusion are not formed along the rim portion around the first battery cell, and the multiple protrusions and the supports being alternately arranged on the valleys at alternate positions along the rim portion around the first battery cell.

9. The battery pack of claim 8, wherein the rim portion comprises a narrow portion having a narrow width and concavely recessed between a protrusion from among the first protrusion, the second protrusion, and the third protrusion and a support from among the supports along the rim portion around the first battery cell.

10. The battery pack of claim 9, wherein the narrow portion comprises multiple narrow portions at six positions along the rim portion around the first battery cell.

11. The battery pack of claim 9, wherein the narrow portion comprises a contact protrusion protruding toward the outer circumference of the first battery cell.

12. The battery pack of claim 11, wherein the contact protrusion protrudes toward the outer circumferential surface of the first battery cell to form an interference fit with the outer circumferential surface of the first battery cell.

13. The battery pack of claim 11, wherein the narrow portion comprises multiple narrow portions, and wherein the contact protrusion comprises multiple contact protrusions protruding from the multiple narrow portions at six symmetrical positions along the rim portion around the first battery cell.

14. The battery pack of claim 7, wherein the cell holder comprises multiple rim portions including the rim portion around the outer circumference of the first battery cell, and wherein the multiple rim portions are around the first battery cell and two neighboring satellite battery cells in the direction of the outer circumference of the first battery cell and directions of outer circumferences of the two neighboring satellite battery cells, respectively, and diverge at the divergence point in each of the valleys.

15. The battery pack of claim 14, wherein the multiple rim portions diverge in an angular form from the divergence point in three directions.

16. The battery pack of claim 14, wherein a curved surface is provided at six divergence points along the outer circumference of the first battery cell, the curved surface facing the outer circumference of the first battery cell through the multiple protrusions and supports alternately provided at alternate positions.

17. The battery pack of claim 16, wherein a side surface of a protrusion from among the multiple protrusions and an end portion of the support from among the supports facing the outer circumference of the first battery cell provide curved surfaces having a concave shape facing the outer circumference of the first battery cell.

18. The battery pack of claim 17, wherein the rim portion comprises a narrow portion having a narrow width and concavely recessed between the protrusion and the support along the rim portion around the first battery cell.

19. The battery pack of claim 18, wherein the narrow portion is consecutively connected between the protrusion and the support and provides a curved surface having a concave shape facing the outer circumference of the first battery cell.

20. The battery pack of claim 1, wherein the cell holder comprises multiple rim portions including the rim portion around the outer circumference of the first battery cell, the multiple rim portions being connected to one another to surround the multiple battery cells so as to form a main surface of the cell holder, wherein the lower end of the first battery cell protrudes by a fixing depth from the main surface of the cell holder in the direction opposite the height direction, and wherein the first battery cell is assembled on the cell holder from the lower end of the first battery cell to an upper end thereof in the height direction.

21. The battery pack of claim 1, wherein the divergence point is separated from the adjacent protrusions.

22. A battery pack comprising:

multiple battery cells; and a cell holder assembled with the multiple battery cells, the cell holder comprising:

a rim portion around an outer circumference of a first battery cell from among the multiple battery cells; and multiple protrusions at positions along the rim portion and protruding from the rim portion in a height direction, wherein side surfaces of the multiple protrusions facing the outer circumference of the first battery cell have a gradient in the height direction, wherein the first battery cell comprises first and second electrodes at an upper end of the first battery cell, and wherein a lower end of the first battery cell protrudes by a depth from a lowermost surface of the rim portion in a direction opposite the height direction.

* * * * *